United States Patent
Ding et al.

(10) Patent No.: US 12,267,825 B2
(45) Date of Patent: Apr. 1, 2025

(54) UPLINK TRANSMISSION METHOD AND COMMUNICATION APPARATUS

(71) Applicant: HUAWEI TECHNOLOGIES CO., LTD., Guangdong (CN)

(72) Inventors: Mengying Ding, Shanghai (CN); Shuri Liao, Shanghai (CN); Peng Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 370 days.

(21) Appl. No.: 17/730,857

(22) Filed: Apr. 27, 2022

(65) Prior Publication Data

US 2022/0256559 A1   Aug. 11, 2022

Related U.S. Application Data

(63) Continuation of application No. PCT/CN2019/114878, filed on Oct. 31, 2019.

(51) Int. Cl.
H04W 72/12 (2023.01)
H04B 7/026 (2017.01)
H04W 88/04 (2009.01)

(52) U.S. Cl.
CPC .......... H04W 72/12 (2013.01); H04B 7/026 (2013.01); H04W 88/04 (2013.01)

(58) Field of Classification Search
CPC ...... H04B 7/026; H04W 72/12; H04W 72/23; H04W 88/04
See application file for complete search history.

(56) References Cited

U.S. PATENT DOCUMENTS

2015/0078279 A1* 3/2015 Ko .............. H04W 52/242
                                                           370/329
2015/0326373 A1* 11/2015 Ryu .............. H04L 5/0092
                                                           370/329

(Continued)

FOREIGN PATENT DOCUMENTS

CN       108512576 A      9/2018
EP       3141049 B1 *    11/2020  ............... H04L 1/00

(Continued)

OTHER PUBLICATIONS

Kyocera, "UE-to-Network Relay Resource Allocation", 3GPP TSG RAN WG1 Meeting #82, R1-154011, Beijing, China, Aug. 24-28, 2015, Total Pages: 5 (Year: 2015).*

(Continued)

*Primary Examiner* — Shah M Rahman
(74) *Attorney, Agent, or Firm* — Fish & Richardson P.C.

(57) ABSTRACT

This application provides example uplink transmission methods and communication apparatuses. One example method includes sending first scheduling information by a network device to a first terminal and a second terminal, where the first scheduling information includes indication information of a sidelink transmission parameter and indication information of a first uplink transmission parameter, the sidelink transmission parameter is used by the first terminal to send first data to the second terminal, and the first uplink transmission parameter is used by the second terminal to send the first data to the network device. The first data is received by the network device from the second terminal.

17 Claims, 13 Drawing Sheets

(56) References Cited

U.S. PATENT DOCUMENTS

| | | | |
|---|---|---|---|
| 2018/0098323 A1* | 4/2018 | Zhang | H04L 5/00 |
| 2018/0176892 A1* | 6/2018 | Kim | H04W 52/04 |
| 2019/0191450 A1* | 6/2019 | Guo | H04W 72/0446 |
| 2019/0357305 A1 | 11/2019 | Su et al. | |
| 2020/0045694 A1* | 2/2020 | Yan | H04W 72/02 |
| 2020/0196321 A1* | 6/2020 | Zhang | H04W 72/21 |
| 2021/0112574 A1* | 4/2021 | Hosseini | H04L 5/0055 |
| 2021/0185715 A1* | 6/2021 | Shen | H04L 5/0023 |
| 2021/0307047 A1* | 9/2021 | Lin | H04L 5/008 |
| 2022/0060285 A1* | 2/2022 | Zhao | H04W 72/23 |
| 2022/0360374 A1* | 11/2022 | Yoshioka | H04L 5/0055 |

FOREIGN PATENT DOCUMENTS

| | | |
|---|---|---|
| WO | 2016089185 A1 | 6/2016 |
| WO | 2017185931 A1 | 11/2017 |
| WO | 2018157673 A1 | 9/2018 |
| WO | 2021068259 A1 | 4/2021 |

OTHER PUBLICATIONS

Qualcomm Inc., "Communication and UE-to-NW relaying aspects", 3GPP TSG RAN WG1 Meeting #88Bis, R1-1705030, Spokane, USA Apr. 3-7, 2017, Total Pages: 2 (Year: 2017).*

PCT International Search Report and Written Opinion issued in International Application No. PCT/CN2019/114878 on Mar. 26, 2020, 17 pages (with English translation).

Extended European Search Report issued in European Application No. 19950579.3 on Sep. 19, 2022, 8 pages.

Huawei et al., "Discussion on Enhancement on Communication," 3GPP TSG RAN WG1 Meeting #88bis, R1-1704308, Spokane, USA, Apr. 3-7, 2017, 3 pages.

ITL Inc., "Considerations on Resource Allocation for UE-to-Network Relays," 3GPP TSG RAN WG1 Meeting #82, R1-154548, Beijing, China, Aug. 24-28, 2015, 4 pages.

* cited by examiner

UPLINK TRANSMISSION METHOD AND COMMUNICATION APPARATUS

CROSS-REFERENCE TO RELATED APPLICATIONS

This application is a continuation of International Application No. PCT/CN2019/114878, filed on Oct. 31, 2019, the disclosure of which is hereby incorporated by reference in its entirety.

TECHNICAL FIELD

This application relates to the communication field, and in particular, to an uplink transmission method and a communication apparatus.

BACKGROUND

Wireless communication technologies have been rapidly developed in the past few decades. A first generation wireless communication system based on an analog communication system, a 2G wireless communication system represented by a global system for mobile communications (global system for mobile communications, GSM), a 3G wireless communication system represented by wideband code division multiple access (wideband code division multiple access, WCDMA), and a 4G wireless communication system, such as long term evolution (long term evolution, LTE), that now has been widely put into commercial use in the world and has achieved great success successively appear. Services supported by the wireless communication system are also developed from initial voice and SMS message services to currently supported wireless high-speed data communication. In addition, a quantity of wireless connections worldwide is continuously increasing at a high speed, and various new wireless service types such as the internet of things and self-driving also emerge massively. All of these pose a higher requirement on a next generation wireless communication system, namely, a 5G system.

Currently, sidelink transmission may be completed between terminal devices on a sidelink resource, and uplink transmission may be completed between a terminal device and a network device on an uplink resource and/or downlink transmission may be completed between the terminal device and the network device on a downlink resource. In the future, user cooperative transmission is further supported. User cooperation means that a terminal device may complete user cooperative transmission, for example, uplink cooperative transmission and/or downlink cooperative transmission, with a network device with the assistance of another terminal device. Refer to FIG. 1. Uplink cooperative transmission means that a second terminal receives data from a first terminal on a first sidelink resource, and forwards the data to a network device on an uplink resource. Downlink cooperative transmission means that the second terminal receives data from the network device on an uplink resource, and forwards the data to the first terminal on a second sidelink resource. The uplink resource is located after the first sidelink resource in time domain, and the second sidelink resource is located after the downlink resource in time domain, so that CUE has sufficient time to complete a data forwarding operation.

SUMMARY

Embodiments of this application provide an uplink transmission method and a communication apparatus, to reduce an uplink cooperative transmission delay and improve uplink cooperative transmission efficiency.

To achieve the foregoing objective, the following technical solutions are used in this application:

According to a first aspect, an uplink transmission method is provided. The method includes: A network device sends first scheduling information to a first terminal and a second terminal. The first scheduling information includes indication information of a sidelink transmission parameter and indication information of a first uplink transmission parameter. The sidelink transmission parameter is used by the first terminal to send first data to the second terminal. The first uplink transmission parameter is used by the second terminal to send the first data to the network device. The network device receives the first data from the second terminal.

In a possible design method, the first scheduling information may further include indication information of a second uplink transmission parameter, and the second uplink transmission parameter is used by the first terminal to send second data to the network device. Correspondingly, the uplink transmission method in the first aspect may further include: The network device receives the second data from the first terminal. In other words, a plurality of types of wireless connections may be simultaneously established between the first terminal and the network device, to improve a throughput of uplink data transmission.

According to a second aspect, an uplink transmission method is provided. The method includes: A first terminal receives first scheduling information from a network device. The first scheduling information includes indication information of a sidelink transmission parameter and indication information of a first uplink transmission parameter. The sidelink transmission parameter is used by the first terminal to send first data to a second terminal. The first uplink transmission parameter is used by the second terminal to send the first data to the network device. The first terminal sends the first data to the second terminal.

In a possible design method, the first scheduling information may further include indication information of a second uplink transmission parameter, and the second uplink transmission parameter is used by the first terminal to send second data to the network device. Correspondingly, the uplink transmission method in the second aspect may further include: The first terminal sends the second data to the network device. In other words, a plurality of types of wireless connections may be simultaneously established between the first terminal and the network device, to improve a throughput of uplink data transmission.

According to a third aspect, an uplink transmission method is provided. The method includes: A second terminal receives first scheduling information from a network device. The first scheduling information includes indication information of a sidelink transmission parameter and indication information of a first uplink transmission parameter. The sidelink transmission parameter is used by a first terminal to send first data to the second terminal. The first uplink transmission parameter is used by the second terminal to send the first data to the network device. The second terminal receives the first data from the first terminal, and sends the first data to the network device.

In a possible design method, the first scheduling information may further include indication information of a second uplink transmission parameter, and the second uplink transmission parameter is used by the first terminal to send second data to the network device. In other words, a plurality of types of wireless connections may be simultaneously established between the first terminal and the network device, to improve a throughput of uplink data transmission.

According to the uplink transmission methods in the first aspect to the third aspect, the network device can indicate, in one piece of scheduling information, both a sidelink resource and a first uplink resource that are required for uplink cooperative transmission, to improve resource scheduling efficiency. In addition, a problem that the sidelink resource and/or the uplink resource are scheduled for a plurality of times because the independently scheduled sidelink resource and uplink resource cannot adapt to the uplink cooperative transmission can be avoided. This can reduce an uplink cooperative transmission delay, and improve uplink cooperative transmission efficiency.

In the uplink transmission method according to any one of the first aspect to the third aspect, the sidelink transmission parameter may include indication information of a sidelink time domain resource, and the sidelink time domain resource is used by the first terminal to send the first data to the second terminal. Correspondingly, the first uplink transmission parameter may include indication information of a first uplink time domain resource, the first uplink time domain resource is used by the second terminal to send the first data to the network device, the second uplink transmission parameter may include indication information of a second uplink time domain resource, and the second uplink time domain resource is used by the first terminal to send the second data to the network device.

For example, the indication information of the sidelink time domain resource may include one or more of a time domain start position, a time domain end position, single-transmission duration, and a repetition quantity that are of the sidelink resource. The time domain start position of the sidelink resource is a start position of the first transmission in one or more transmissions corresponding to the repetition quantity, for example, a slot in which the first symbol in the first transmission is located. The time domain end position of the sidelink resource is an end position of the last transmission in the one or more transmissions corresponding to the repetition quantity, for example, a slot (slot) in which the last symbol in the last transmission is located. The repetition quantity is a positive integer. Alternatively, the repetition quantity may not be configured, and in this case, it may be considered by default that there is a single transmission.

For example, the indication information of the first uplink time domain resource may include a time domain start position of the first uplink resource, or a time domain offset between a time domain start position of the first uplink resource and the time domain start position or the time domain end position of the sidelink resource. The time domain start position of the first uplink resource may be one or both of a start symbol (symbol) of the first uplink resource in time domain and a slot in which the start symbol is located.

Optionally, the time domain offset between the time domain start position of the first uplink resource and the time domain start position or the time domain end position of the sidelink resource may include one of the following: a first time domain offset and a third time domain offset. The first time domain offset may be a time domain offset between the time domain start position of the first uplink resource and the time domain end position of the sidelink resource; and the third time domain offset may be a time domain offset between the time domain start position of the first uplink resource and the time domain start position of the sidelink resource.

In embodiments of this application, the time domain start position of the first uplink resource may be directly configured, or may be determined in the following manner 1 to manner 3. Details are described below.

Manner 1: The time domain start position of the first uplink resource is: a sum of the time domain start position of the sidelink resource and the third time domain offset.

Manner 2: The time domain start position of the first uplink resource is: a sum of the time domain end position of the sidelink resource and the first time domain offset.

Manner 3: The time domain start position of the first uplink resource is: a sum of the time domain start position of the sidelink resource, total sidelink transmission duration, and the first time domain offset.

For example, the indication information of the second uplink time domain resource may include a time domain start position of the second uplink resource, or a time domain offset between a time domain start position of the second uplink resource and the time domain start position or the time domain end position of the sidelink resource. The time domain start position of the second uplink resource may be one or both of a start symbol (symbol) of the second uplink resource in time domain and a slot in which the start symbol is located.

Optionally, the time domain offset between the time domain start position of the second uplink resource and the time domain start position or the time domain end position of the sidelink resource may include one of the following: a second time domain offset and a fourth time domain offset. The second time domain offset may be a time domain offset between the time domain start position of the second uplink resource and the time domain end position of the sidelink resource; and the fourth time domain offset may be a time domain offset between the time domain start position of the second uplink resource and the time domain start position of the sidelink resource.

In embodiments of this application, the time domain start position of the second uplink resource may be directly configured, or may be determined in the following, manner 4 to manner 6. Details are described below.

Manner 4: The time domain start position of the second uplink resource is: a sum of the time domain start position of the sidelink resource and the fourth time domain offset.

Manner 5: The time domain start position of the second uplink resource is: a sum of the time domain end position of the sidelink resource and the second time domain offset.

Manner 6: The time domain start position of the second uplink resource is: a sum of the time domain start position of the sidelink resource, total sidelink transmission duration, and the second time domain offset.

It should be noted that, in the foregoing manner 3 and manner 6, when the repetition quantity is configured to 1, or the repetition quantity is not configured, that is, sidelink transmission is a single transmission, the total sidelink transmission duration is single-transmission duration.

Optionally, when the repetition quantity is greater than 1, for example, when sidelink transmission is a plurality of continuous transmissions, the total sidelink transmission duration is a product of single-transmission duration and the repetition quantity.

It should be noted that content of the indication information of the first uplink time domain resource and content of the indication information of the second uplink time domain resource may be completely the same, partially the same, or completely different. Same parts may be indicated by a same indication field in the first scheduling information, that is, the same parts may be indicated only once, to reduce signaling overheads.

Further, in the uplink transmission method according to any one of the first aspect to the third aspect, the first uplink transmission parameter may further include a first uplink MCS, and the second uplink transmission parameter may further include a second uplink MCS. The first uplink MCS and the second uplink MCS are indicated by a same indication field in the first scheduling information. In other words, when the first uplink MCS and the second uplink MCS are the same, the first uplink MCS and the second uplink MCS may occupy a same indication field in the first scheduling information, to further reduce signaling overheads.

Still further, in the uplink transmission method according to any one of the first aspect to the third aspect, the first uplink transmission parameter may further include indication information of a first uplink frequency domain resource, the first uplink frequency domain resource is used by the second terminal to send the first data to the network device, the second uplink transmission parameter may further include indication information of a second uplink frequency domain resource, and the second uplink frequency domain resource is used by the first terminal to send the second data to the network device. The indication information of the first uplink frequency domain resource and the indication information of the second uplink frequency domain resource are indicated by a same indication field in the first scheduling information. In other words, when the indication information of the first uplink frequency domain resource and the indication information of the second uplink frequency domain resource are the same, the indication information of the first uplink frequency domain resource and the indication information of the second uplink frequency domain resource may occupy a same indication field in the first scheduling information, to further reduce signaling overheads.

In the uplink transmission method according to any one of the first aspect to the third aspect, the second data may be different from the first data, to improve an uplink throughput between the first terminal and the network device, and improve uplink transmission efficiency. Alternatively, the second data may be the same as the first data, that is, the first data and the second data both are data obtained by encoding and modulating same original data by using a same MCS. The network device may perform combined decoding on a first uplink signal carrying the first data and a second uplink signal carrying the second data, to improve a decoding success rate, and improve uplink data transmission reliability.

According to a fourth aspect, a communication apparatus is provided. The communication apparatus is used as a network device to communicate with a first terminal and a second terminal. The communication apparatus includes a receiving module and a sending module. The sending module is configured to send first scheduling information to the first terminal and the second terminal. The first scheduling information includes indication information of a sidelink transmission parameter and indication information of a first uplink transmission parameter. The sidelink transmission parameter is used by the first terminal to send first data to the second terminal. The first uplink transmission parameter is used by the second terminal to send the first data to the network device. The receiving module is configured to receive the first data from the second terminal.

In a possible design, the first scheduling information may further include indication information of a second uplink transmission parameter, and the second uplink transmission parameter is used by the first terminal to send second data to the network device. The receiving module is further configured to receive the second data from the first terminal.

According to a fifth aspect, a communication apparatus is provided. The communication apparatus is used as a first terminal to communicate with a network device and a second terminal. The communication apparatus includes a receiving module and a sending module. The receiving module is configured to receive first scheduling information from the network device. The first scheduling information includes indication information of a sidelink transmission parameter and indication information of a first uplink transmission parameter. The sidelink transmission parameter is used by the first terminal to send first data to the second terminal. The first uplink transmission parameter is used by the second terminal to send the first data to the network device. The sending module is configured to send the first data to the second terminal.

In a possible design, the first scheduling information may further include indication information of a second uplink transmission parameter, and the second uplink transmission parameter is used by the first terminal to send second data to the network device. The sending module is further configured to send the second data to the network device.

According to a sixth aspect, a communication apparatus is provided. The communication apparatus is used as a second terminal to communicate with a network device and a first terminal. The communication apparatus includes a receiving module and a sending module. The receiving module is configured to receive first scheduling information from the network device. The first scheduling information includes indication information of a sidelink transmission parameter and indication information of a first uplink transmission parameter. The sidelink transmission parameter is used by the first terminal to send first data to the second terminal. The first uplink transmission parameter is used by the second terminal to send the first data to the network device. The receiving module is further configured to receive the first data from the first terminal. The sending module is configured to send the first data to the network device.

In a possible design, the first scheduling information may further include indication information of a second uplink transmission parameter, and the second uplink transmission parameter is used by the first terminal to send second data to the network device.

In the communication apparatus according to any one of the fourth aspect to the sixth aspect, the sidelink transmission parameter may include indication information of a sidelink time domain resource, and the sidelink time domain resource is used by the first terminal to send the first data to the second terminal. Correspondingly, the first uplink transmission parameter may include indication information of a first uplink time domain resource, the first uplink time domain resource is used by the second terminal to send the first data to the network device, the second uplink transmission parameter may include indication information of a second uplink time domain resource, and the second uplink time domain resource is used by the first terminal to send the second data to the network device.

For example, the indication information of the sidelink time domain resource may include one or more of a time domain start position, a time domain end position, single-transmission duration, and a repetition quantity that are of the sidelink resource. The time domain start position of the sidelink resource is a start position of the first transmission in one or more transmissions corresponding to the repetition quantity, for example, a slot in which the first symbol in the first transmission is located. The time domain end position of the sidelink resource is an end position of the last transmission in the one or more transmissions corresponding to the repetition quantity, for example, a slot (slot) in which the last symbol in the last transmission is located. The repetition quantity is a positive integer. Alternatively, the repetition quantity may not be configured, and in this case, it may be considered by default that there is a single transmission.

For example, the indication information of the first uplink time domain resource may include a time domain start position of the first uplink resource, or a time domain offset between a time domain start position of the first uplink resource and the time domain start position or the time domain end position of the sidelink resource. The time domain start position of the first uplink resource may be one or both of a start symbol (symbol) of the first uplink resource in time domain and a slot in which the start symbol is located.

Optionally, the time domain offset between the time domain start position of the first uplink resource and the time domain start position or the time domain end position of the sidelink resource may include one of the following: a first time domain offset and a third time domain offset. The first time domain offset may be a time domain offset between the time domain start position of the first uplink resource and the time domain end position of the sidelink resource; and the third time domain offset may be a time domain offset between the time domain start position of the first uplink resource and the time domain start position of the sidelink resource.

In embodiments of this application, the time domain start position of the first uplink resource may be directly configured, or may be determined in the following manner 1 to manner 3. Details are described below.

Manner 1: The time domain start position of the first uplink resource is: a sum of the time domain start position of the sidelink resource and the third time domain offset.

Manner 2: The time domain start position of the first uplink resource is: a sum of the time domain end position of the sidelink resource and the first time domain offset.

Manner 3: The time domain start position of the first uplink resource is: a sum of the time domain start position of the sidelink resource, total sidelink transmission duration, and the first time domain offset.

For example, the indication information of the second uplink time domain resource may include a time domain start position of the second uplink resource, or a time domain offset between a time domain start position of the second uplink resource and the time domain start position or the time domain end position of the sidelink resource. The time domain start position of the second uplink resource may be one or both of a start symbol of the second uplink resource in time domain and a slot in which the start symbol is located.

Optionally, the time domain offset between the time domain start position of the second uplink resource and the time domain start position or the time domain end position of the sidelink resource may include one of the following: a second time domain offset and a fourth time domain offset. The second time domain offset may be a time domain offset between the time domain start position of the second uplink resource and the time domain end position of the sidelink resource; and the fourth time domain offset may be a time domain offset between the time domain start position of the second uplink resource and the time domain start position of the sidelink resource.

In embodiments of this application, the time domain start position of the second uplink resource may be directly configured, or may be determined in the following manner 4 to manner 6. Details are described below.

Manner 4: The time domain start position of the second uplink resource is: a sum of the time domain start position of the sidelink resource and the fourth time domain offset.

Manner 5: The time domain start position of the second uplink resource is: a sum of the time domain end position of the sidelink resource and the second time domain offset.

Manner 6: The time domain start position of the second uplink resource is: a sum of the time domain start position of the sidelink resource, total sidelink transmission duration, and the second time domain offset.

It should be noted that, in the foregoing manner 3 and manner 6, when the repetition quantity is configured to 1, or the repetition quantity is not configured, that is, sidelink transmission is a single transmission, the total sidelink transmission duration is single-transmission duration.

Optionally, when the repetition quantity is greater than 1, for example, when sidelink transmission is a plurality of continuous transmissions, the total sidelink transmission duration is a product of single-transmission duration and the repetition quantity.

It should be noted that content of the indication information of the first uplink time domain resource and content of the indication information of the second uplink time domain resource may be completely the same, partially the same, or completely different. Same parts may be indicated by a same indication field in the first scheduling information, that is, the same parts may be indicated only once, to reduce signaling overheads.

Further, in the communication apparatus according to any one of the fourth aspect to the sixth aspect, the first uplink transmission parameter may further include a first uplink MCS, and the second uplink transmission parameter may further include a second uplink MCS. The first uplink MCS and the second uplink MCS are indicated by a same indication field in the first scheduling information. In other words, when the first uplink MCS and the second uplink MCS are the same, the first uplink MCS and the second uplink MCS may occupy a same indication field in the first scheduling information, to reduce signaling overheads.

Still further, in the communication apparatus according to any one of the fourth aspect to the sixth aspect, the first uplink transmission parameter may further include indication information of a first uplink frequency domain resource, the first uplink frequency domain resource is used by the second terminal to send the first data to the network device, the second uplink transmission parameter may further include indication information of a second uplink frequency domain resource, and the second uplink frequency domain resource is used by the first terminal to send the second data to the network device. The indication information of the first uplink frequency domain resource and the indication information of the second uplink frequency domain resource are indicated by a same indication field in the first scheduling information. In other words, when the indication information of the first uplink frequency domain resource and the indication information of the second uplink frequency domain resource are the same, the indication information of the first uplink frequency domain resource and the indication information of the second uplink frequency domain resource may occupy a same indication field in the first scheduling information, to further reduce signaling overheads.

In the communication apparatus according to any one of the fourth aspect to the sixth aspect, the second data may be different from the first data, or may be the same as the first data. This is not limited in embodiments of this application.

Optionally, the communication apparatus according to any one of the fourth aspect to the sixth aspect may further include a processing module and a storage module, and the storage module stores a program or instructions. When the processing module executes the program or the instructions, the communication apparatus according to any one of the fourth aspect to the sixth aspect may perform the uplink transmission method according to any one of the first aspect to the third aspect.

It should be noted that the communication apparatus according to any one of the fourth aspect to the sixth aspect may be the first terminal, the second terminal, or the network device according to any one of the first aspect to the third aspect, may be a component or a combined component of the first terminal, the second terminal, or the network device, or may be a chip or a chip system disposed in the first terminal, the second terminal, or the network device. This is not limited in this application.

According to a seventh aspect, a communication apparatus is provided. The communication apparatus is configured to perform the uplink transmission method according to any one of the first aspect to the third aspect.

According to an eighth aspect, a communication apparatus is provided. The communication apparatus includes a processor. The processor is coupled to a memory, and the memory is configured to store a computer program. The processor is configured to execute a computer program stored in the memory, to enable the communication apparatus to perform the uplink transmission method according to any one of the possible implementations of the first aspect to the third aspect.

In a possible design, the communication apparatus in the eighth aspect may further include a transceiver. The transceiver may be a transceiver circuit or an input/output port. The transceiver may be used by the communication apparatus to communicate with another communication apparatus.

In this application, the communication apparatus in the eighth aspect may be a terminal device or a network device, or may be a component or a combined component in the first terminal, the second terminal, or a network device, or a chip or a chip system disposed in the terminal device or the network device.

For technical effects of the communication apparatus according to the eighth aspect, refer to technical effects of the uplink transmission method according to any one of the possible implementations of the first aspect to the third aspect. Details are not described herein again.

For technical effects of the communication apparatus according to any one of the fourth aspect to the eighth aspect, refer to the technical effects of the uplink transmission method according to any one of the possible implementations of the first aspect to the third aspect. Details are not described herein again.

According to a ninth aspect, a communication apparatus is provided. The communication apparatus includes a processor. For example, the processor is configured to implement functions or methods according to any one of the possible implementations of the first aspect to the third aspect. For example, the communication apparatus may be a chip system. In a feasible implementation, the chip system further includes a memory. The memory is configured to store program instructions and data that are necessary for implementing the functions of the method in the first aspect to the third aspect.

The chip system in the foregoing aspects may be a system on chip (system on chip, SOC), may be a baseband chip, or the like. The baseband chip may include a processor, a channel encoder, a digital signal processor, a modem, an interface module, or the like.

The chip system in the foregoing aspects may include a chip, or may include a chip and another discrete component.

According to a tenth aspect, a communication system is provided. The communication system includes a first terminal and one or more second terminals. The first terminal and the one or more second terminals belong to a same multicast group.

According to an eleventh aspect, a communication system is provided. The communication system includes a first terminal, one or more second terminals, and a network device.

According to a twelfth aspect, a computer-readable storage medium is provided. The computer-readable storage medium stores computer instructions. When the computer instructions are run on a computer, the computer is enabled to perform the uplink transmission method according to any one of the possible implementations of the first aspect to the third aspect.

According to a thirteenth aspect, a computer program product including instructions is provided. The computer program product includes a computer program or the instructions. When the computer program is run or the instructions are run on a computer, the computer is enabled to perform the uplink transmission method according to any one of the possible implementations of the first aspect to the third aspect.

DESCRIPTION OF EMBODIMENTS

The following uses uplink cooperative transmission as an example to describe possible problem in user cooperative transmission.

Figure 1:
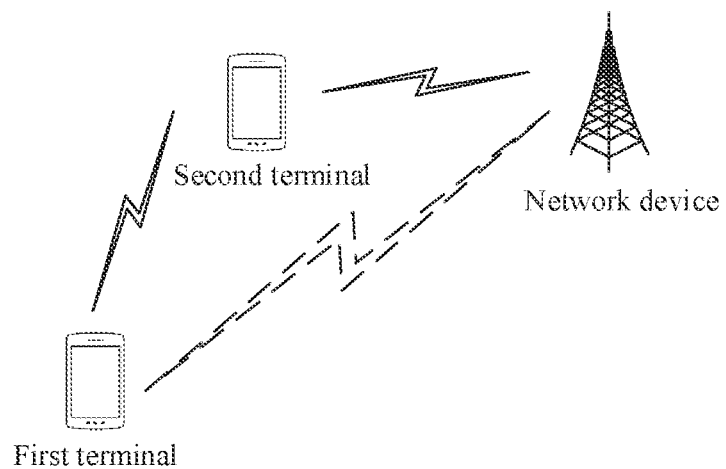
FIG. 1 is a schematic architectural diagram of a communication system according to an embodiment of this application.

Refer to FIG. 1. In the user cooperative transmission, if a sidelink resource and an uplink resource are independently scheduled by a network device, for example, the network device schedules the sidelink resource by using one piece of radio resource control (radio resource control, RRC) signaling, and schedules the uplink resource by using another piece of RRC signaling, the sidelink resource and the uplink resource that are scheduled by the network device may not adapt to uplink cooperative transmission. In other words, when the network device independently schedules the sidelink resource and the uplink resource, whether the scheduled uplink resource and sidelink resource can adapt to the uplink cooperative transmission is not considered. For example, the uplink cooperative transmission is used as an example. In one case, the sidelink resource scheduled by the network device may be located before the uplink resource or excessively close to the uplink resource in terms of time, so that a second terminal does not have sufficient time to receive data from a first terminal, and to complete an operation of forwarding the data to the network device, for example, receiving and decoding a sidelink radio signal that carries the data, restoring original information of the data, re-encoding and re-modulating the restored original information, mapping modulated data to the uplink resource, and sending the data to the network device.

However, as a result, if the scheduled uplink resource and sidelink resource cannot adapt to the uplink cooperative transmission, for example, the uplink resource is located before the sidelink resource in time domain, or although the uplink resource is located after the sidelink resource in time domain, a time interval between the uplink resource and the sidelink resource is less than the shortest time required by the second terminal to perform the forwarding operation on the received data, the network device further needs to re-schedule an uplink resource and a sidelink resource. In other words, the resource scheduling operation needs to be performed for a plurality of times, to schedule a sidelink resource and an uplink resource that are required for the forwarding operation, and resource scheduling efficiency is low Consequently, an uplink cooperative transmission delay is long, and uplink cooperative transmission efficiency is low.

To resolve the foregoing problem, embodiments of this application provide a technical solution applicable to the uplink cooperative transmission. The following describes the technical solution of this application with reference to the accompanying drawings.

The technical solution of embodiments of this application may be applied to various communication systems: a 4th generation (4th generation, 4G) mobile communication system, such as a long term evolution (long term evolution, LTE) system, a 5th generation (5th generation, 5G) mobile communication system, such as a new radio (new radio, NR) system, a future communication system, such as a 6th generation (6th generation, 6G) mobile communication system, a wireless fidelity (wireless fidelity, Wi-Fi) system, and the like.

All aspects, embodiments, or features are presented in this application by describing a system that may include a plurality of devices, components, modules, and the like. It should be appreciated and understood that, each system may include another device, component, module, and the like, and/or may not include some devices, components, modules, and the like discussed with reference to the accompanying drawings. In addition, a combination of these solutions may also be used.

In addition, in embodiments of this application, terms such as "example" and "for example" are used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

In embodiments of this application, terms "information (information)", "signal (signal)", "message (message)", "channel (channel)", and "signaling (signaling)" may sometimes be interchangeably used. It should be noted that, meanings expressed by the terms are consistent when differences between the terms are not emphasized. "Of (of)", "corresponding, relevant (corresponding, relevant)", and "corresponding (corresponding)" may be interchangeably used sometimes. It should be noted that, meanings expressed by the terms are consistent when differences between the terms are not emphasized.

In embodiments of this application, sometimes a subscript, for example, $W_1$, may be written in an incorrect form, for example, W1. Expressed meanings are consistent when differences are not emphasized.

A network architecture and a service scenario described in embodiments of this application are intended to describe the technical solution in embodiments of this application more clearly, and do not constitute a limitation on the technical solution provided in embodiments of this application. A person of ordinary skill in the art may know that with evolution of the network architecture and emergence of a new service scenario, the technical solution provided in embodiments of this application are also applicable to similar technical problems.

Some scenarios in embodiments of this application are described by using a scenario in a communication system shown in FIG. 1 as an example. It should be noted that the solution of embodiments of this application max also be applied to another mobile communication system, and a corresponding name may also be replaced with a name of a corresponding function in the another mobile communication system.

FIG. 1 is a schematic architectural diagram of a communication system to which an uplink transmission method according to an embodiment of this application is applicable. For ease of understanding of embodiments of this application, the communication system shown in FIG. 1 is first used as an example to describe in detail a communication system to which embodiments of this application are applicable. As shown in FIG. 1, the communication system includes a network device and at least two terminal devices, for example, a first terminal and a second terminal. Quantities of second terminals and network devices shown in FIG. 1 may be 1 or more. When there are a plurality of second terminals, the first terminal may simultaneously have a plurality of communication connections to a plurality of network devices by using the plurality of second terminals, or may have one communication connection to a same network device by using a plurality of second terminals. In other words, the first terminal may establish an indirect communication connection to one or more network devices by using one or more second terminals as relays (relays). It should be understood that, the first terminal may alternatively establish a direct communication connection to one or more network devices. In other words, there may be one or more communication connections between the first terminal and the network device. Types and a quantity of possible communication connections between the first terminal and the network device are not limited in embodiments of this application.

It should be noted that, in embodiments of this application, the first terminal may also be referred to as a source terminal (source user equipment, SUE), and the second terminal may also be referred to as a cooperation terminal (cooperation user equipment, CUE).

Refer to FIG. 1. The network device is configured to send first scheduling information to the first terminal and the second terminal. The first scheduling information includes indication information of a sidelink transmission parameter and indication information of a first uplink transmission parameter. The sidelink transmission parameter is used by the first terminal to send first data to the second terminal. The first uplink transmission parameter is used by the second terminal to send the first data to the network device. The network device is further configured to receive the first data from the second terminal.

In a possible design, the first scheduling information may further include indication information of a second uplink transmission parameter, and the second uplink transmission parameter is used by the first terminal to send second data to the network device. Correspondingly, the network device is further configured to receive the second data from the first terminal. In other words, a plurality of types of wireless connections may be simultaneously established between the first terminal and the network device, to improve a throughput of uplink data transmission.

The first terminal is configured to receive first scheduling information from the network device. The first scheduling information includes indication information of a sidelink transmission parameter and indication information of a first uplink transmission parameter. The sidelink transmission parameter is used by the first terminal to send first data to the second terminal. The first uplink transmission parameter is used by the second terminal to send the first data to the network device. The first terminal is further configured to send the first data to the second terminal.

In a possible design, the first scheduling information may further include indication information of a second uplink transmission parameter, and the second uplink transmission parameter is used by the first terminal to send second data to the network device. Correspondingly, the first terminal is further configured to send the second data to the network device.

The second terminal is configured to receive first scheduling information from the network device. The first scheduling information includes indication information of a sidelink transmission parameter and indication information of a first uplink transmission parameter. The sidelink transmission parameter is used by the first terminal to send first data to the second terminal. The first uplink transmission parameter is used by the second terminal to send the first data to the network device. The second terminal is further configured to: receive the first data from the first terminal, and send the first data to the network device.

In a possible design, the first scheduling information may further include indication information of a second uplink transmission parameter, and the second uplink transmission parameter is used by the first terminal to send second data to the network device.

In embodiments of this application, the network device may be any device having a wireless transceiver function. The network device includes but is not limited to: an evolved NodeB (NodeB or eNB or e-NodeB, evolved NodeB) in LTE, a base station (gNodeB or gNB) or a transmission reception point (transmission receiving point/transmission reception point, TRP) in NR, a subsequently evolved base station in 3GPP, an access node in a Wi-Fi system, a wireless relay node, a wireless backhaul node, and the like. The base station may be a macro base station, a micro base station, a picocell base station, a small cell, a relay station, a balloon station, or the like. A plurality of base stations may support the aforementioned networks of a same technology, or may support the aforementioned networks of different technologies. The base station may include one or more co-site or non-co-site TRPs. The network device may alternatively be a radio controller, a centralized unit (centralized unit, CU), and/or a distributed unit (distributed unit, DU) in a cloud radio access network (cloud radio access network, CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with a terminal device, or may communicate with a terminal device through a relay station. The terminal device may communicate with a plurality of base stations using different technologies. For example, the terminal device may communicate with a base station supporting an LTE network, may communicate with a base station supporting a 5G network, and may further support a dual connection to a base station in an LIE network and a base station in a 5G network.

The first terminal and the second terminal are devices having wireless communication functions, and may be deployed on land, including indoor devices, outdoor devices, handheld devices, or vehicle-mounted devices, may be deployed on a water surface (such as a ship), or may be deployed in the air (for example, on an airplane, a balloon, or a satellite). The terminal may be a mobile phone (mobile phone), a tablet computer (Pad), a computer having a wireless transceiver function, a virtual reality (virtual reality, VR) terminal device, an augmented reality (augmented reality, AR) terminal device, a wireless terminal in industrial control (industrial control), a vehicle-mounted terminal device, a wireless terminal in self driving (self driving), a wireless terminal in telemedicine (telemedicine), a wireless terminal in a smart grid (smart grid), a wireless terminal in transportation safety (transportation safety), a wireless terminal in a smart city (smart city), a wireless terminal in a smart home (smart home), a wearable terminal device, or the like. Application scenarios are not limited in embodiments of this application. The terminal may also be sometimes referred to as a terminal device, user equipment (user equipment, UE), an access terminal device, a vehicle-mounted terminal, an industrial control terminal, a UE unit, a UE station, a mobile station, a mobile console, a remote station, a remote terminal device, a mobile device, a UE terminal device, a terminal device, a wireless communication device, a UE agent, a UE apparatus, or the like. The terminal may alternatively be a fixed terminal or a mobile terminal.

It should be noted that the second terminal serves as a relay device between the first terminal and the network device, and may be a terminal device or a network device. This is not limited in embodiments of this application.

It should be understood that FIG. 1 is merely a simplified schematic diagram of an example for ease of understanding. The communication system may further include another network device and/or another terminal device that are/is not shown in FIG. 1.

Figure 2:
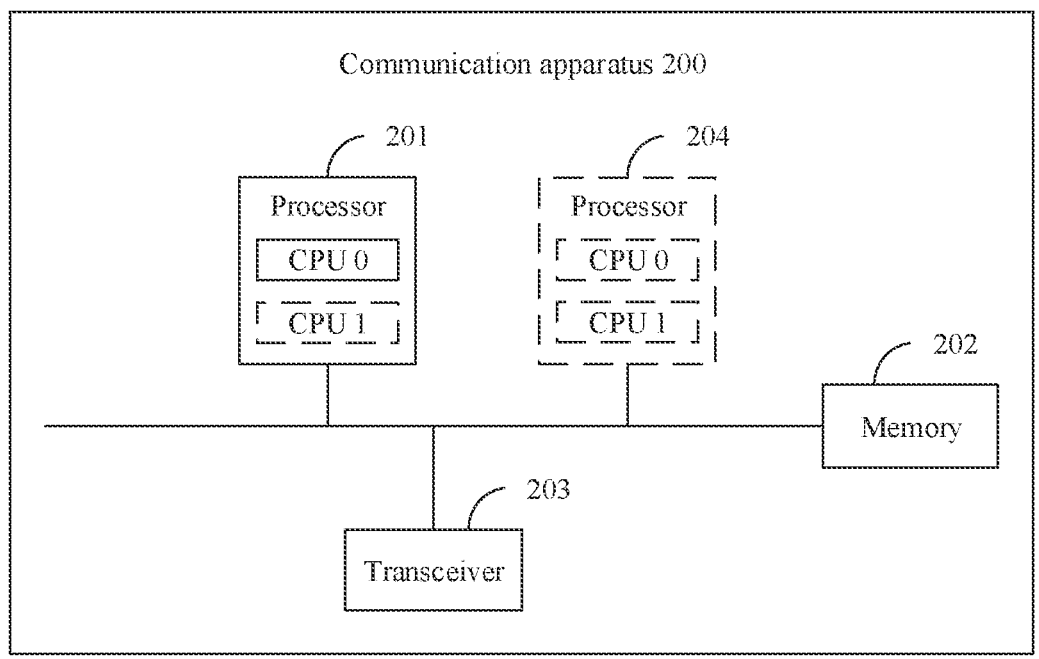
FIG. 2 is a schematic diagram 1 of a structure of a communication apparatus according to an embodiment of this application.

FIG. 2 is a schematic diagram of a structure of a communication apparatus 200 in an uplink transmission method according to an embodiment of this application. On the one hand, the communication apparatus 200 may be a terminal device, for example, the first terminal and the second terminal in FIG. 1, or may be a chip used in the terminal device or another component that has a terminal function. On the other hand, the communication apparatus 200 may be a network device, or may be a chip used in the network device or another component that has a network device function.

As shown in FIG. 2, the communication apparatus 200 may include a processor 201, a memory 202, and a transceiver 203. The processor 201 is coupled to the memory 202 and the transceiver 203. For example, the processor 201 may be connected to the memory 202 and the transceiver 203 through a communication bus.

The following describes each component of the communication apparatus 200 in detail with reference to FIG. 2.

The processor 201 is a control center of the communication apparatus 200, and may be one processor or may be a collective term of a plurality of processing elements. Fax example, the processor 201 may be one or more central processing units (central processing units, CPUs), or an application-specific integrated circuit (application-specific integrated circuit, ASIC), or may be configured as one or more integrated circuits implementing embodiments of this application, for example, one or more microprocessors (digital signal processors, DSPs) or one or more field programmable gate arrays (field programmable gate arrays, FPGAs).

The processor 201 may execute various functions of the communication apparatus 200 by running or executing a software program stored in the memory 202 and invoking data stored in the memory 202.

During specific implementation, in an embodiment, the processor 201 may include one or more CPUs, for example, a CPU 0 and a CPU 1 shown in FIG. 2.

During specific implementation, in an embodiment, the communication apparatus 200 may alternatively include a plurality of processors, for example, the processor 201 and a processor 204 shown in FIG. 2. Each of the processors may be a single-core processor (single-CPU) or may be a multi-core processor (multi-CPU). The processor herein may be one or more communication devices, circuits, and/or processing cores configured to process data (for example, computer program instructions).

The memory 202 may be a read-only memory (read-only memory, ROM) or another type of static storage communication device that can store static information and instructions; or a random access memory (random access memory, PAM) or another type of dynamic storage communication device that can store information and instructions. The memory 202 may alternatively be an electrically erasable programmable read-only memory (electrically erasable programmable read-only memory, EEPROM), a compact disc read-only memory (compact disc read-only memory, CD-ROM) or another compact disc storage, optical disc storage (including a compact disc, a laser disc, an optical disc, a digital versatile disc, a Blu-ray disc, or the like), a magnetic disk storage medium or another magnetic storage communication device, or any other medium that can be used to carry or store expected program code in a form of instructions or a data structure and that is accessible by a computer, but is not limited thereto. The memory 202 may exist independently, or may be integrated with the processor 201.

The memory 202 is configured to store a software program for executing the solution of this application, and the processor 201 controls execution. For a specific implementation, refer to the following method embodiment. Details are not described herein.

The transceiver 203 is configured to communicate with another communication apparatus. Certainly, the transceiver 203 may be further configured to communicate with a communication network. The transceiver 203 may include a receiver to implement a receiving function, and a transmitter to implement a sending function.

It should be noted that a structure of the communication apparatus 200 shown in FIG. 2 does not constitute a limitation on the communication apparatus. An actual communication apparatus may include more or fewer components than those shown in the figure, or combine some components, or have different component arrangement.

Figure 3:
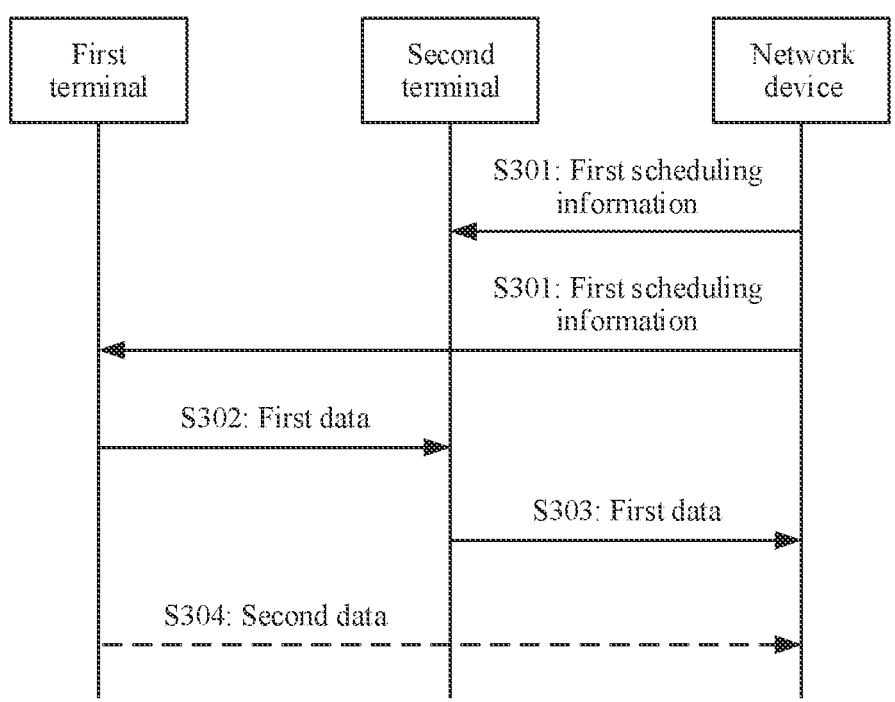
FIG. 3 is a schematic flowchart of an uplink transmission method according to an embodiment of this application.
Figure 4:
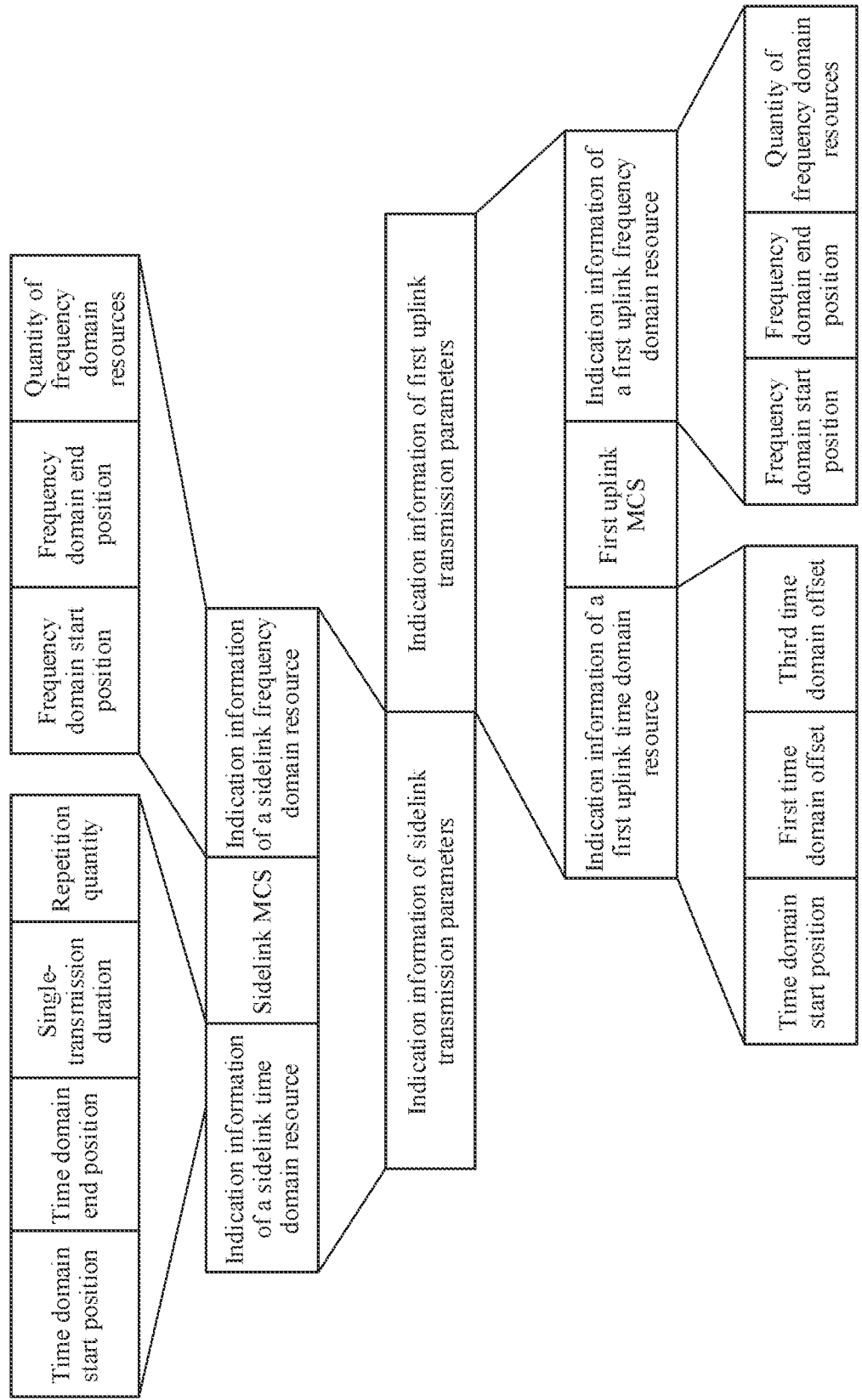
FIG. 4 is a schematic diagram 1 of DCI carrying first scheduling information according to an embodiment of this application.
Figure 5:
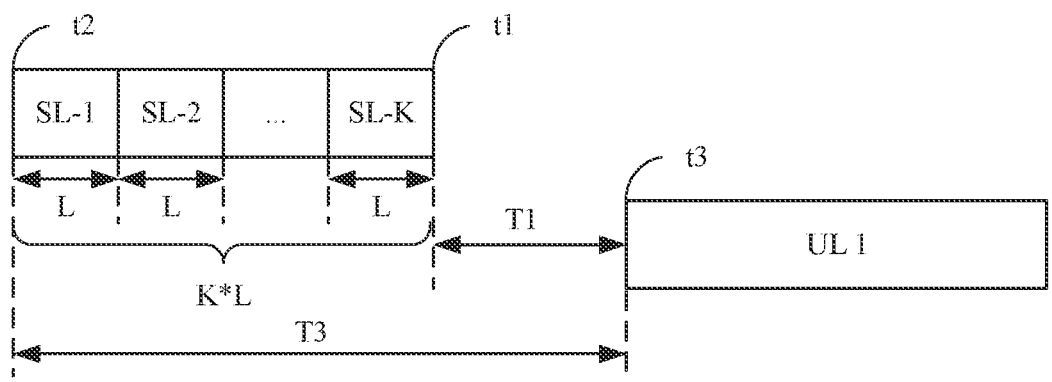
FIG. 5 is a schematic diagram 1 of a time domain position relationship between a first uplink resource and a sidelink resource according to an embodiment of this application.

The following describes in detail the uplink transmission method provided in embodiments of this application with reference to FIG. 3 to FIG. 5.

FIG. 3 is a schematic flowchart of an uplink transmission method according to an embodiment of this application. The uplink transmission method may be applied to uplink cooperative communication between the first terminal and the network device through the second terminal, and/or direct uplink communication between the first terminal and the network device shown in FIG. 1.

As shown in FIG. 3, the uplink transmission method includes the following steps.

S301: A network device sends first scheduling information to a first terminal and a second terminal. Correspondingly, the first terminal and the second terminal receive the first scheduling information from the network device.

For example, the network device may send the first scheduling information to the first terminal and the second terminal through a physical downlink control channel (physical downlink control channel, PDCCH). For example, the first scheduling information may be carried in downlink control information (downlink control information, DCI) of the PDCCH.

For example, FIG. 4 is a schematic diagram 1 of DCI carrying first scheduling information according to an embodiment of this application. The following describes content of the first scheduling information in detail with reference to FIG. 4.

In a possible design method, as shown in FIG. 4, the first scheduling information includes indication information of a sidelink transmission parameter and indication information of a first uplink transmission parameter, the sidelink transmission parameter is used by the first terminal to send first data to the second terminal, and the first uplink transmission parameter is used by the second terminal to send the first data to the network device.

As shown in FIG. 4, the sidelink transmission parameter may include indication information of a sidelink time domain resource, and the sidelink time domain resource is used by the first terminal to send the first data to the second terminal; and the first uplink transmission parameter may include indication information of a first uplink time domain resource, and the first uplink time domain resource is used by the second terminal to send the first data to the network device.

For example, as shown in FIG. 4, the indication information of the sidelink time domain resource may include one or more of a time domain start position, a time domain end position, single-transmission duration, and a repetition quantity that are of the sidelink resource. The time domain start position of the sidelink resource is a start position of the first transmission in one or more transmissions corresponding to the repetition quantity, for example, a slot in which the first symbol in the first transmission is located. The time domain end position of the sidelink resource is an end position of the last transmission in the one or more transmissions corresponding to the repetition quantity, for example, a slot (slot) in which the last symbol in the last transmission is located. The repetition quantity is a positive integer. Alternatively, the repetition quantity may not be configured, and in this case, it may be considered by default that there is a single transmission.

It should be noted that content of the indication information of the sidelink time domain resource is not specifically limited in this embodiment of this application, provided that the time domain position of the sidelink resource can be uniquely determined. For example, for a plurality of sidelink transmissions, the indication information of the sidelink time domain resource may include only the time domain start position, the single-transmission duration, and the repetition quantity that are of the sidelink resource, or include only the time domain end position, the single-transmission duration, and the repetition quantity. For another example, for a single sidelink transmission, the indication information of the sidelink time domain resource may not include the repetition quantity. Further, the indication information of the sidelink time domain resource may include only the time domain start position and the time domain end position that are of the sidelink resource, or include only the time domain start position and the single-transmission duration that are of the sidelink resource, or include only the time domain end position and the single-transmission duration that are of the sidelink resource.

For example, as shown in FIG. 4, the indication information of the first uplink time domain resource may include a time domain start position of the first uplink resource or a time domain offset between the first uplink resource and the sidelink resource. In addition, the indication information of the first uplink time domain resource may further include a time domain end position, transmission duration, and the like that are of the first uplink resource. The time domain start position of the first uplink resource may include a symbol number of a time domain start symbol of the first uplink resource and/or a slot number of a slot in which the time domain start symbol is located. The "symbol (symbol)" may be an orthogonal frequency division multiplexing (orthogonal frequency division multiplexing, OFDM) symbol, and the "slot (slot)" may be one of a full slot (full slot), a short slot (short slot), or a mini slot (mini slot).

Optionally, as shown in FIG. 4, the time domain offset between the first uplink resource and the sidelink resource may include one of the following: a first time domain offset and a third time domain offset. The first time domain offset may be a time domain offset between the time domain start position of the first uplink resource and the time domain end position of the sidelink resource; and the third time domain offset may be a time domain offset between the time domain start position of the first uplink resource and the time domain start position of the sidelink resource.

It should be noted that content of the indication information of the first uplink tune domain resource is not specifically limited in this embodiment of this application, provided that it can be ensured that the time domain start position of the first uplink resource is after the time domain end position of the sidelink resource, to be specific, a time domain position relationship between the first uplink resource and the sidelink resource can ensure that the second terminal has sufficient processing time to complete the following operations: receiving the first data from the first terminal, demodulating and decoding the first data to obtain original information of the first data, re-modulating and re-encoding the original information, and forwarding the first data to the network device. For example, the indication information of the first uplink time domain resource may include only the time domain start position of the first uplink resource. For another example, if the indication information of the sidelink time domain resource includes the time domain start position, the single-transmission duration, and the repetition quantity that are of the sidelink resource, the indication information of the first uplink time domain resource may include only the first time domain offset. For still another example, if the indication information of the sidelink time domain resource includes the time domain start position of the sidelink resource, the indication information of the first uplink time domain resource may include only the third time domain offset.

With reference to specific examples, the following describes in detail how to determine the time domain start position of the first uplink resource when the indication information of the first uplink time domain resource does not include the time domain start position of the first uplink resource.

For example, FIG. 5 is a schematic diagram 1 of a time domain position relationship between a sidelink resource and a first uplink resource according to an embodiment of this application. As shown in FIG. 5, the indication information of the sidelink time domain resource may include one or more of a time domain end position t1, a time domain start position t2, single-transmission duration L, and a repetition quantity K that are of the sidelink resource. SL-i is a sidelink resource occupied by an $i^{th}$ transmission, where i is a positive integer, and a value range of i is 1 to K. The repetition quantity K is a quantity of sidelink transmissions or an index value a one-to-one correspondence with the quantity of sidelink transmissions. The single-transmission duration L is duration of a single transmission in the K sidelink transmissions, for example, may be a quantity of consecutive symbols included in the single transmission. The time domain start position t2 is a time domain start position of the first transmission in K repeated transmissions, for example, may include a symbol number of a time domain start symbol of the first transmission and/or a slot number of a slot in which the time domain start symbol is located. The time domain end position t1 is an end position of the last transmission in the K repeated transmissions, for example, may include a symbol number of a time domain end symbol of the last transmission and/or a slot number of a slot in which the time domain end symbol is located.

As shown in FIG. 5, the indication information of the first uplink time domain resource may include one or more of the following: a time domain start position t3 of the first uplink resource, a first time domain offset T1 between the time domain start position t3 of the first uplink resource and the time domain end position t1 of the sidelink resource, and a third time domain offset T3 between the time domain start position t3 of the first uplink time domain resource and the time domain start position t2 of the sidelink resource. The time domain start position of the first uplink resource may include a symbol number of a time domain start symbol of the first uplink resource and/or a slot number of a slat in which the time domain start symbol is located.

Figure 6:
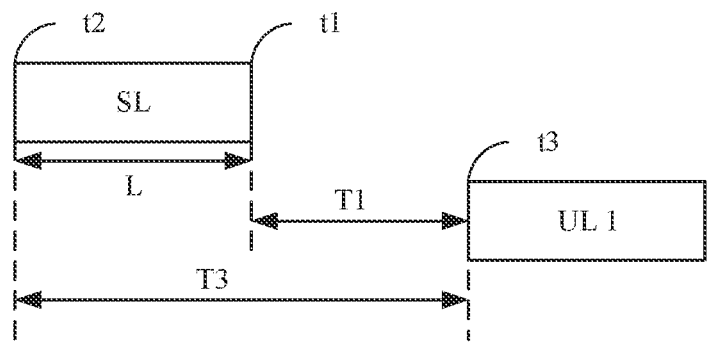
FIG. 6 is a schematic diagram 2 of a time domain position relationship between a first uplink resource and a sidelink resource according to an embodiment of this application.

Refer to FIG. 5. It should be noted that, when K=1, it may be considered that there is a single transmission. Alternatively, when the repetition quantity K is not configured, it may also be considered by default that there is a single transmission. For example, FIG. 6 is a schematic diagram 2 of a time domain position relationship between a sidelink resource and a first uplink resource according to an embodiment of this application. Refer to FIG. 5. As shown in FIG. 6, in a scenario of a single transmission, the indication information of the sidelink time domain resource may not include the repetition quantity K.

In this embodiment of this application, the time domain start position of the first uplink resource may be determined in one of the following manner 1 to manner 3. Details are described below with reference to FIG. 5 and FIG. 6.

Manner 1: The time domain start position t3 of the first uplink resource may be: a sum of the time domain end position t1 of the sidelink resource and the first time domain offset T1 that is, as shown in FIG. 5 and FIG. 6, t3=t1+T1.

Manner 2: The time domain start position t3 of the first uplink resource may be: a sum of the time domain start position t2 of the sidelink resource, total sidelink transmission duration, and the first time domain offset T1, that is, as shown in FIG. 5, t3=t2+K*L+T1. When the repetition quantity is greater than 1, and sidelink transmission is a plurality of continuous transmissions, the total sidelink transmission duration is a product of the repetition quantity K and the single-transmission duration L, that is. K*L.

Manner 3: The time domain start position t3 of the first uplink resource may be: a sum of the time domain start position t2 of the sidelink resource and the third time domain offset T3, that is, as shown in FIG. 5 and FIG. 6, t3=t2+T3.

Figure 7:
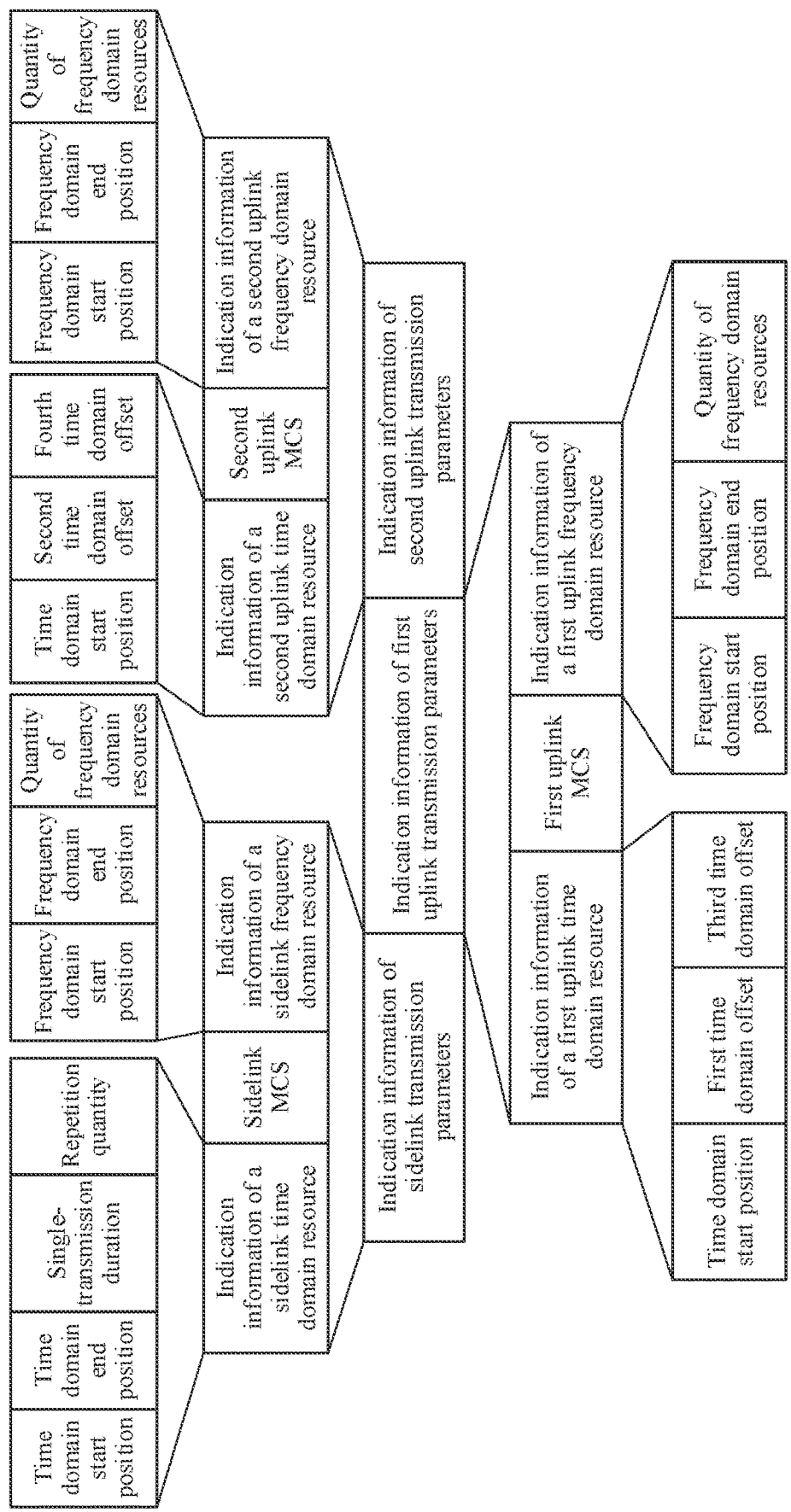
FIG. 7 is a schematic diagram 2 of LACI carrying first scheduling information according to an embodiment of this application.

For example, FIG. 7 is a schematic diagram 2 of DCI carrying first scheduling information according to an embodiment of this application. The following further describes content of the first scheduling information in detail with reference to FIG. 7.

In a possible design method, as shown in FIG. 7, the first scheduling information may further include indication information of a second uplink transmission parameter, and the second uplink transmission parameter is used by the first terminal to send second data to the network device.

Optionally, with reference to FIG. 4, as shown in FIG. 7, the second uplink transmission parameter may include indication information of a second uplink time domain resource, and the second uplink time domain resource is used by the first terminal to send the second data to the network device.

For example, as shown in FIG. 7, the indication information of the second uplink time domain resource may include a time domain start position of the second uplink resource or a time domain offset between the second uplink resource and the sidelink resource. In addition, the indication information of the second uplink time domain resource may include a time domain end position, transmission duration, and the like that are of the second uplink resource. The time domain start position of the second uplink resource may include a symbol number of a time domain start symbol (symbol) of the second uplink resource and/or a slot number of a slot in which the time domain start symbol is located.

Optionally, as shown in FIG. 7, the time domain offset between the second uplink resource and the sidelink resource may include one of the following: a second time domain offset and a fourth time domain offset. The second time domain offset may be a time domain offset between the time domain start position of the second uplink resource and the time domain end position of the sidelink resource; and the fourth time domain offset may be a time domain offset between the time domain start position of the second uplink resource and the time domain start position of the sidelink resource.

It should be noted that content of the indication information of the second uplink time domain resource is not specifically limited in this embodiment of this application, provided that the time domain start position of the second uplink resource can be uniquely determined, and it is ensured that the time domain start position of the second uplink resource is after the time domain end position of the sidelink resource. For example, the indication information of the second uplink time domain resource may include only the time domain start position of the second uplink resource. For another example, if the indication information of the sidelink time domain resource includes the time domain start position, the single-transmission duration, and the repetition quantity that are of the sidelink resource, the indication information of the second uplink time domain resource may include only the second time domain offset. For still another example, if the indication information of the sidelink time domain resource includes the time domain start position of the sidelink resource, the indication information of the second uplink time domain resource may include only the fourth time domain offset.

In addition, in a scenario in which channel quality is poor, the first terminal may send, with the assistance of the second terminal, the first data to the network device on the sidelink resource and the first uplink resource, and send the first data to the network device on the second uplink resource, so that the network device performs combined decoding on the first data received on the first uplink resource and the first data received on the second uplink resource, to improve a decoding success rate, and further improve uplink data transmission reliability. In this case, a time domain position relationship between the second uplink resource and the first uplink resource further needs to ensure that a time deviation between time at which the first data forwarded by the second terminal on the first uplink resource arrives at the network device and time at which the first data sent by the first terminal on the second uplink resource arrives at the network device is less than or equal to an arrival time deviation threshold, to reduce a quantity of storage resources used by the network device to buffer the first data.

With reference to specific examples, the following describes in detail a method for determining the time domain start position of the second uplink resource.

Figure 8:
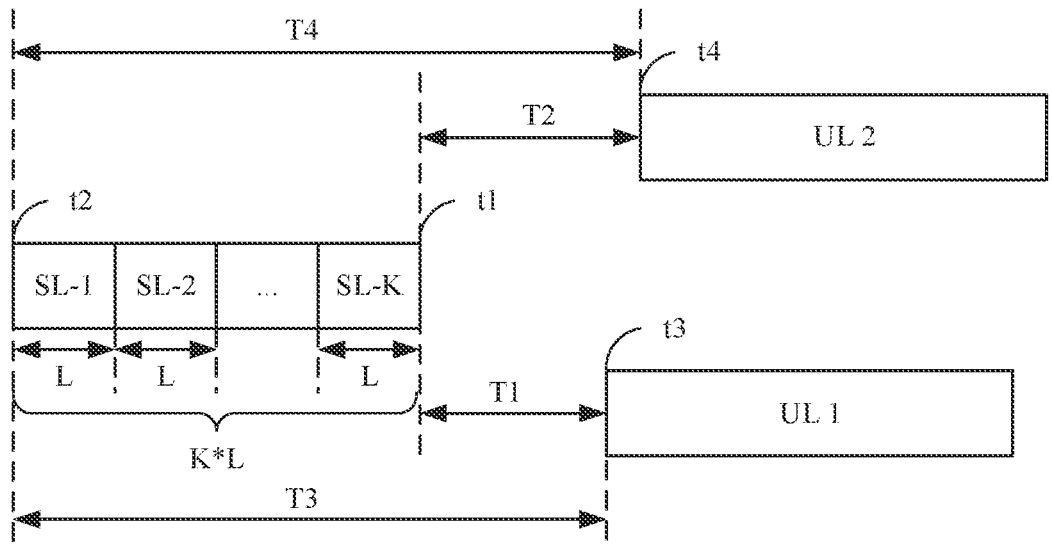
FIG. 8 is a schematic diagram 1 of a time domain position relationship among a first uplink resource, a second uplink resource, and a sidelink resource according to an embodiment of this application.
Figure 9:
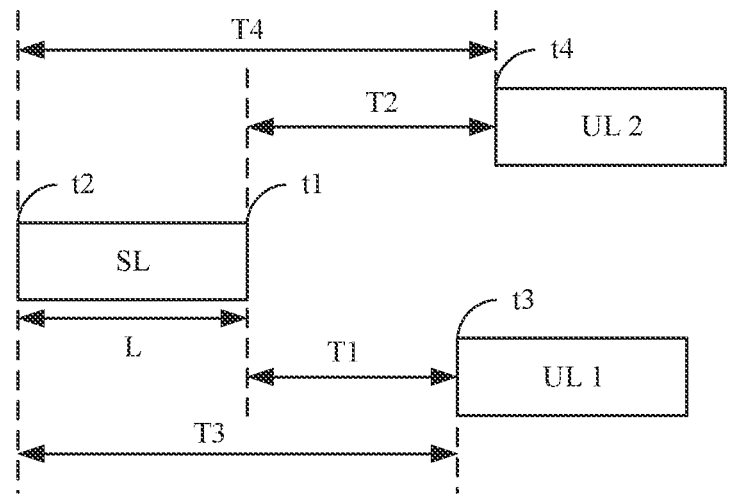
FIG. 9 is a schematic diagram 2 of a time domain position relationship among a first uplink resource, a second uplink resource, and a sidelink resource according to an embodiment of this application.

As shown in FIG. 8 and FIG. 9, the indication information of the second uplink time domain resource may include one or more of the following: a time domain start position t4 of the second uplink resource, a second time domain offset T2 between the time domain start position t4 of the second uplink resource and the time domain end position t1 of the sidelink resource, and a fourth time domain offset T4 between the time domain start position t4 of the second uplink time domain resource and the time domain start position t2 of the sidelink resource. The time domain start position of the second uplink resource may include a symbol number of a time domain start symbol of the second uplink resource and/or a slot number of a slot in which the time domain start symbol is located.

In this embodiment of this application, the time domain start position of the second uplink resource may be determined in the following manner 4 to manner 6. Details are described below.

Manner 4: The time domain start position t4 of the second uplink resource may be: a sum of the time domain end position t1 of the sidelink resource and the second time domain offset T2, that is, as shown in FIG. 8 and FIG. 9, t4=t1±T2.

Manner 5: The time domain start position t4 of the second uplink resource may be: a sum of the time domain start position t2 of the sidelink resource, total sidelink transmission duration, and the second time domain offset T2, that is, as shown in FIG. 8, t4=t2+K*L+T2. When the repetition quantity is greater than 1, and sidelink transmission is a plurality of continuous transmissions, the total sidelink transmission duration is a product of the repetition quantity K and the single-transmission duration L, that is, K*L.

Manner 6: The time domain start position t4 of the second uplink resource may be: a sum of the time domain start position t2 of the sidelink resource and the fourth time domain offset T4, that is, as shown in FIG. 8 and FIG. 9, t4=t2+T4.

It should be noted that, in the foregoing manner 2 and manner 5, when sidelink transmission is a single transmission, for example, the repetition quantity is configured to 1, or the repetition quantity is not configured, the total sidelink transmission duration is the single-transmission duration L.

It is easily understood that the indication information of the first uplink time domain resource and the indication information of the second uplink time domain resource may be completely the same, partially the same, or completely different. Same content in the indication information of the first uplink time domain resource and the indication information of the second uplink time domain resource may be indicated by a same indication field in the first scheduling information, to reduce signaling overheads. For example, as shown in FIG. 8 and FIG. 9, that the indication information of the first uplink time domain resource and the indication information of the second uplink time domain resource are partially the same may include one or more of the following: t3=t4, T1=T2, and T3=T4.

Figure 10:
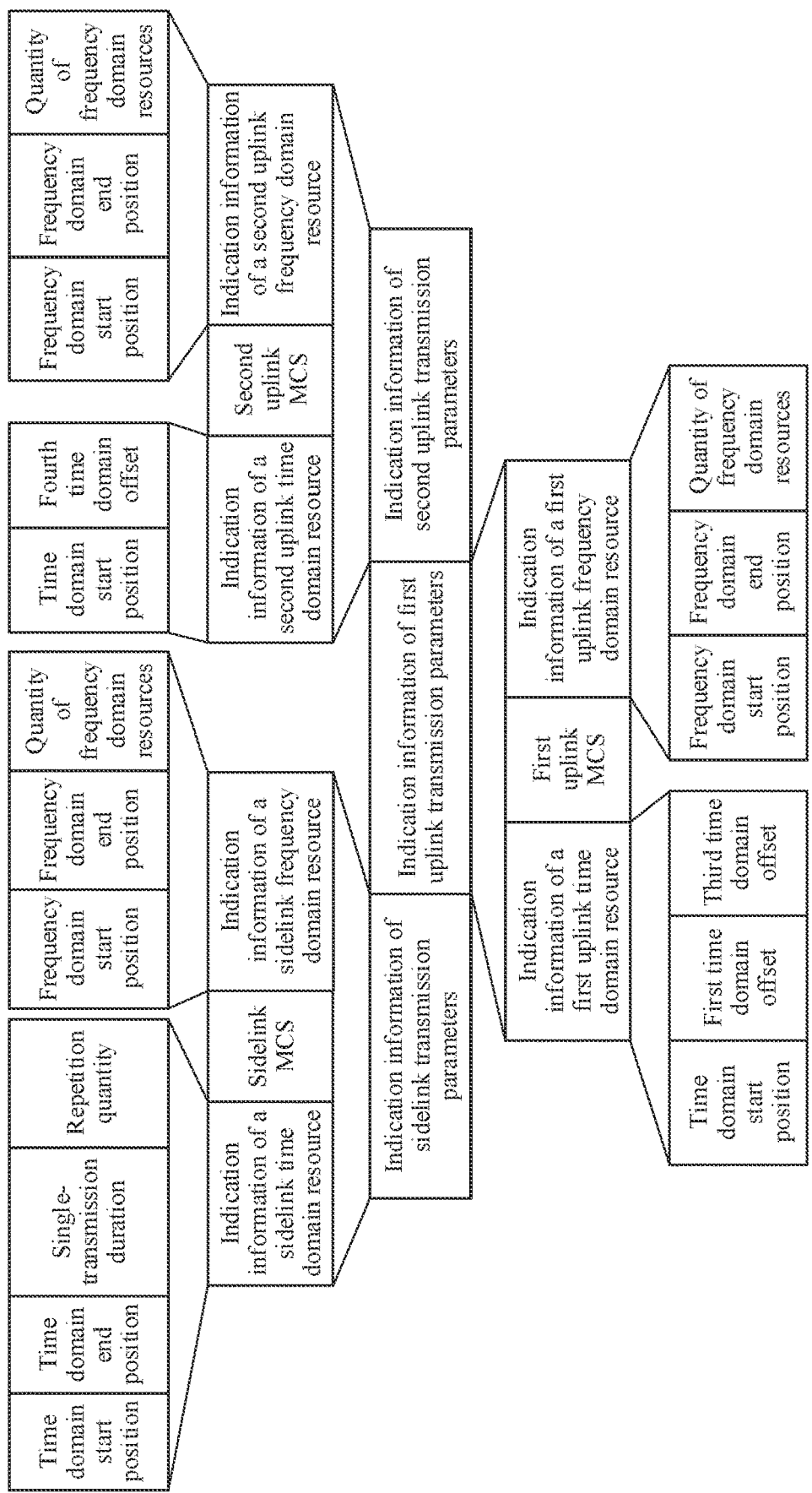
FIG. 10 is a schematic diagram 3 of DCI carrying first scheduling information according to an embodiment of this application.
Figure 11:
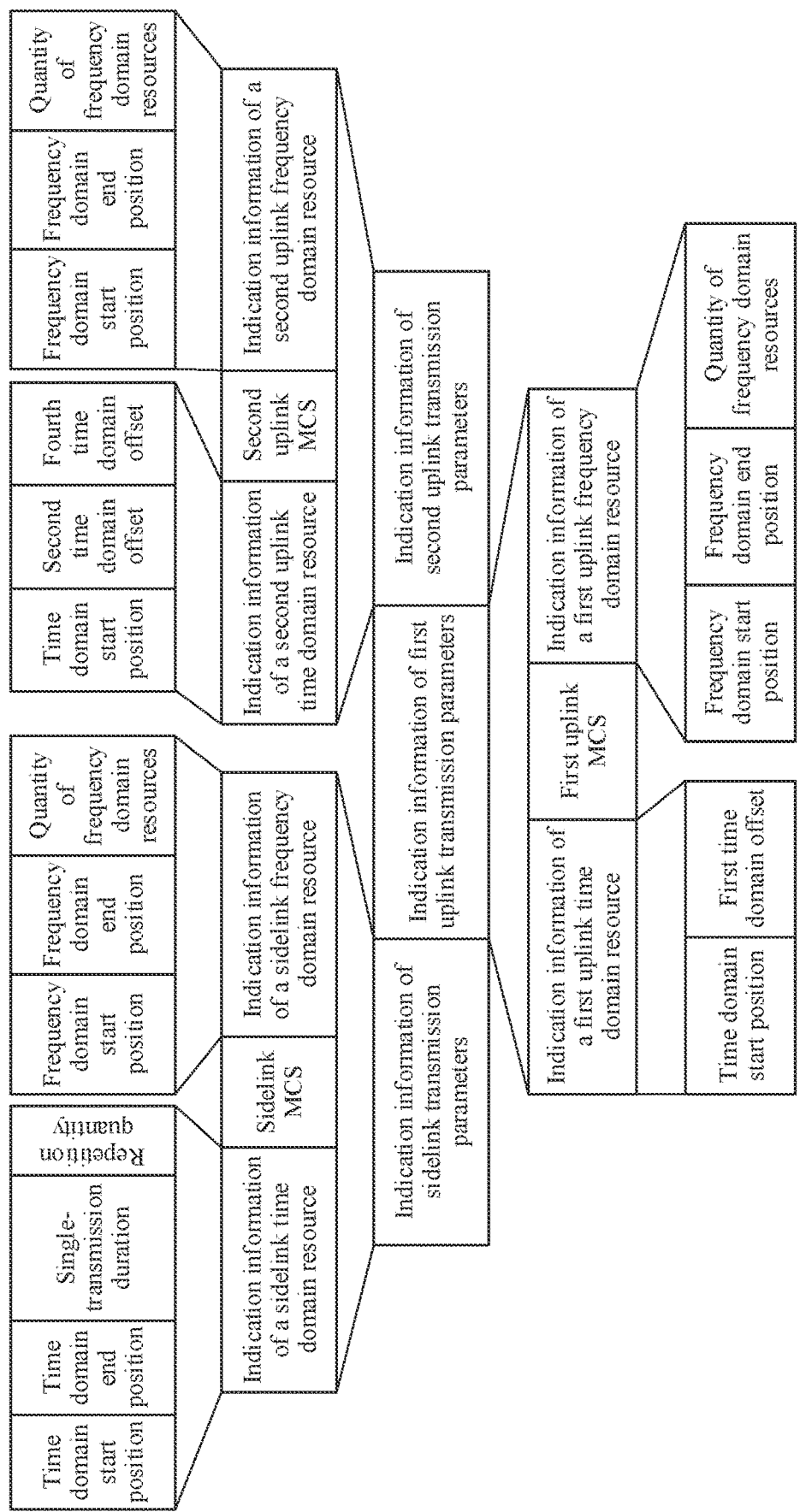
FIG. 11 is a schematic diagram 4 of DCI carrying first scheduling information according to an embodiment of this application.
Figure 12:
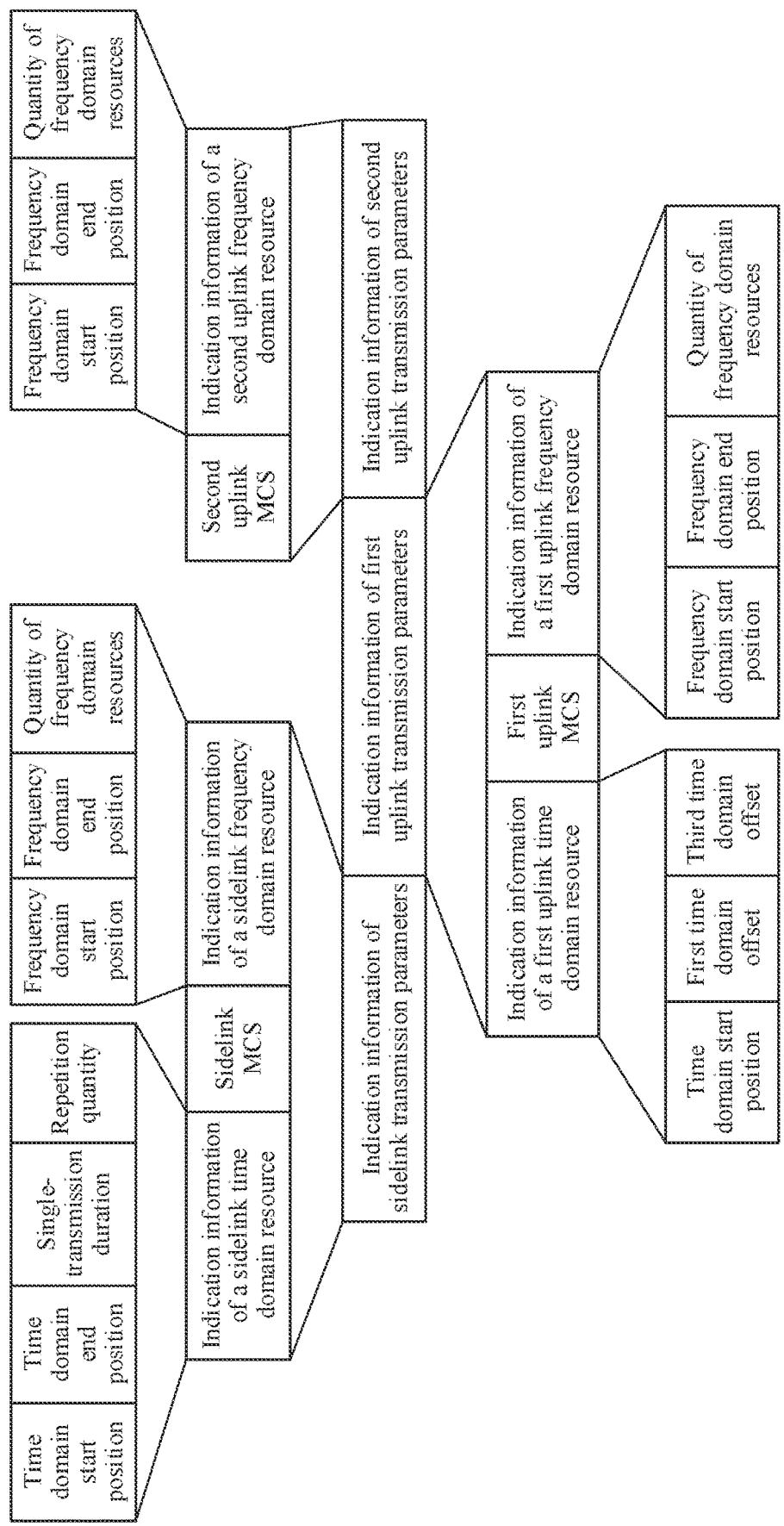
FIG. 12 is a schematic diagram 5 of DCI carrying first scheduling information according to an embodiment of this application.

For example, FIG. 10 to FIG. 12 are respectively schematic diagrams 3 to 5 of DCI carrying first scheduling information according to embodiments of this application. The following further describes content of the first scheduling information in detail with reference to FIG. 7 to FIG. 9 and FIG. 10 to FIG. 12.

Refer to FIG. 7 to FIG. 9. Assuming that T1=T2, that is, the first time domain offset is equal to the second time domain offset, T1 and T2 may occupy a same indication field, to reduce signaling overheads. As shown in FIG. 10, because T1=T2, only T1 is carried in the indication information of the first uplink time domain resource, and T2 does not need to be carried in the indication information of the second uplink time domain resource. Certainly, alternatively, only T2 may be carried in the indication information of the second uplink time domain resource, and T1 does not need to be carried in the indication information of the first uplink time domain resource. In other words, because T1=T2, only one of the indication field of the first time domain offset and the indication field of the second time domain offset needs to be transmitted.

Similarly, refer to FIG. 7 to FIG. 9. Assuming that T3=T4, that is, the third time domain offset is equal to the fourth time domain offset, T3 and T4 may occupy a same indication field, to reduce signaling overheads. As shown in FIG. 11, because T3=T4, only T3 is carried in the indication information of the first uplink time domain resource, and T4 does not need to be carried in the indication information of the second uplink time domain resource. Certainly, alternatively, only T4 may be carried in the indication information of the second uplink time domain resource, and T3 does not need to be carried in the indication information of the first uplink time domain resource. In other words, because T3=T4, only one of the third time domain offset and the fourth time domain offset needs to be transmitted.

Further, if the indication information of the first uplink time domain resource and the indication information of the second uplink time domain resource are completely the same, only one of the indication information of the first uplink time domain resource and the indication information of the second uplink time domain resource needs to be transmitted. For example, as shown in FIG. 12, the indication information of the first uplink transmission parameter includes the indication information of the first uplink time domain resource, and the indication information of the second uplink transmission parameter does not include indication information of the second uplink time domain resource.

Further, as shown in FIG. 7, the sidelink transmission parameter may further include a sidelink modulation and coding scheme (modulation and coding scheme, MCS), the first uplink transmission parameter may further include a first uplink MCS, and the second uplink transmission parameter may further include a second uplink MCS. Any two of the sidelink MCS, the first uplink MCS, and the second uplink MCS may be the same or may be different. When any two of the sidelink MCS, the first uplink MCS, and the second uplink MCS are the same, the any two MCSs may occupy a same indication field in the first scheduling information, to further reduce signaling overheads. For example, if the first uplink MCS and the second uplink MCS are the same, the first uplink MCS and the second uplink MCS may occupy a same indication field in the first scheduling information.

Figure 13:
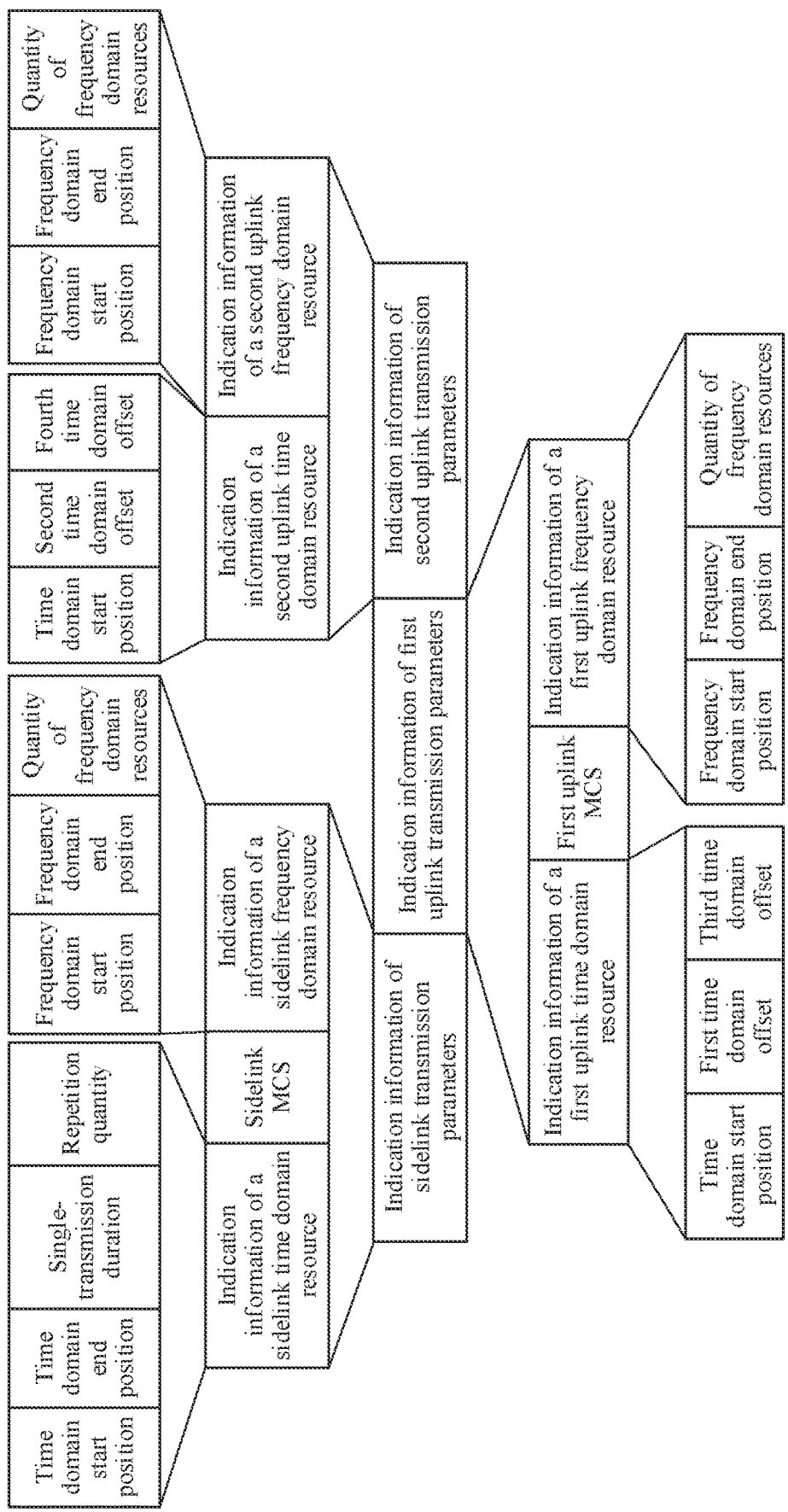
FIG. 13 is a schematic diagram 6 of DCI carrying first scheduling information according to an embodiment of this application.

For example, FIG. 13 is a schematic diagram 6 of DCI carrying first scheduling information according to an embodiment of this application. With reference to FIG. 7, assuming that the first uplink MCS and the second uplink MCS are the same, the first uplink MCS and the second uplink MCS may occupy a same indication field in the first scheduling information, to further reduce signaling overheads. As shown in FIG. 13, because the first uplink MCS and the second uplink MCS are the same, only the first uplink MCS and the second uplink MCS need to be carried in a first uplink MCS indication field in the indication information of the first uplink transmission parameter, and the second uplink MCS does not need to be carried in the indication information of the second uplink transmission parameter. Certainly, alternatively, only the first uplink MCS and the second uplink MCS may be carried in a second uplink MCS indication field in the indication information of the second uplink transmission parameter, and the first uplink MCS does not need to be carried in a first uplink MCS indication field in the indication information of the first uplink transmission parameter.

Still further, as shown in FIG. 7, the sidelink transmission parameter may further include indication information of a sidelink frequency domain resource, the first uplink transmission parameter may further include indication information of a first uplink frequency domain resource, the first uplink frequency domain resource is used by the second terminal to send the first data to the network device, the second uplink transmission parameter may further include indication information of a second uplink frequency domain resource, and the second uplink frequency domain resource is used by the first terminal to send the second data to the network device. The indication information of the first uplink frequency domain resource and the indication information of the second uplink frequency domain resource may be the same or may be different. When the indication information of the first uplink frequency domain resource and the indication information of the second uplink frequency domain resource are the same, the indication information of the first uplink frequency domain resource and the indication information of the second uplink frequency domain resource may occupy a same indication field in the first scheduling information, to further reduce signaling overheads. The indication information of each frequency domain resource may include one or more of a frequency domain start position, a frequency domain end position, and a quantity of frequency domain resources that are of each resource on a communication link. The frequency domain start position and the frequency domain end position that are of each resource may be represented by the following: a resource block (resource block, RB) index, a physical resource block (physical resource block, PRB), a sub-band (sub-band) index, a sub-channel (sub-channel) index, or the like. The quantity of frequency domain resources of each resource may include quantities of RBs, PRBs, sub-bands, and sub-channels included in each frequency domain resource. An implementation of the indication information of each frequency domain resource is not specifically limited in this embodiment of this application.

Similar to the indication information of the first uplink time domain resource and the indication information of the second uplink time domain resource, the indication information of the first uplink frequency domain resource and the indication information of the second uplink frequency domain resource may be completely the same, partially the same, or completely different. Same content in the indication information of the first uplink frequency domain resource and the indication information of the second uplink frequency domain resource may also occupy a same indication field in the first scheduling information, to further reduce signaling overheads. For a transmission scheme used when the indication information of the first uplink frequency domain resource and the indication information of the second uplink frequency domain resource are partially the same, refer to the transmission scheme, shown in FIG. 10 or FIG. 11, used when the indication information of the first uplink time domain resource and the indication information of the second uplink time domain resource are partially the same. Details are not described herein again.

Figure 14:
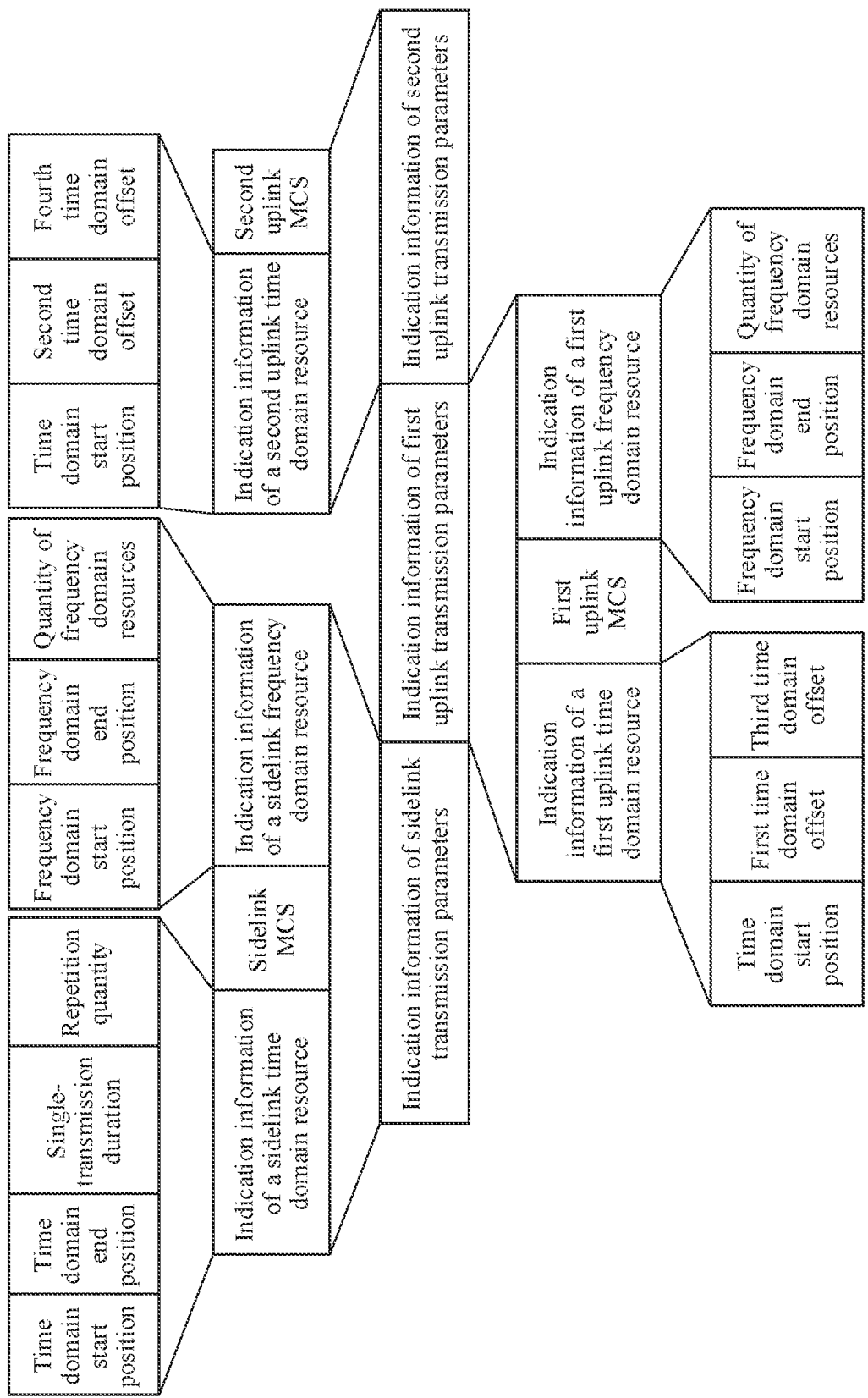
FIG. 14 is a schematic diagram 7 of DCI carrying first scheduling information according to an embodiment of this application.

For example, FIG. 14 is a schematic diagram 7 of DCI carrying first scheduling information according to an embodiment of this application. With reference to FIG. 7, assuming that the indication information of the first uplink frequency domain resource and the indication information of the second uplink frequency domain resource are completely the same, the indication information of the first uplink frequency domain resource and the indication information of the second uplink frequency domain resource may occupy a same indication field in the first scheduling information. As shown in FIG. 14, because the indication information of the first uplink frequency domain resource and the indication information of the second uplink frequency domain resource are completely the same, only the indication information of the first uplink frequency domain resource and the indication information of the second uplink frequency domain resource need to be carried in an indication field of the indication information of the first uplink frequency domain resource in the indication information of the first uplink transmission parameter, and the indication information of the second uplink frequency domain resource does not need to be carried in an indication field of the indication information of the second uplink frequency domain resource in the indication information of the second uplink transmission parameter. Certainly, alternatively, the indication information of the first uplink frequency domain resource and the indication information of the second uplink frequency domain resource may be carried in an indication field of the indication information of the second uplink frequency domain resource in the indication information of the second uplink transmission parameter, and the indication information of the first uplink frequency domain resource does not need to be carried in an indication field of the indication information of the first uplink frequency domain resource in the indication information of the first uplink transmission parameter.

Still further, refer to FIG. 7. If content of the indication information of the first uplink transmission parameter and content of the indication information of the second uplink transmission parameter are completely the same, the indication information of the first uplink transmission parameter and the indication information of the second uplink transmission parameter may occupy a same indication field in the first scheduling information.

Figure 15:
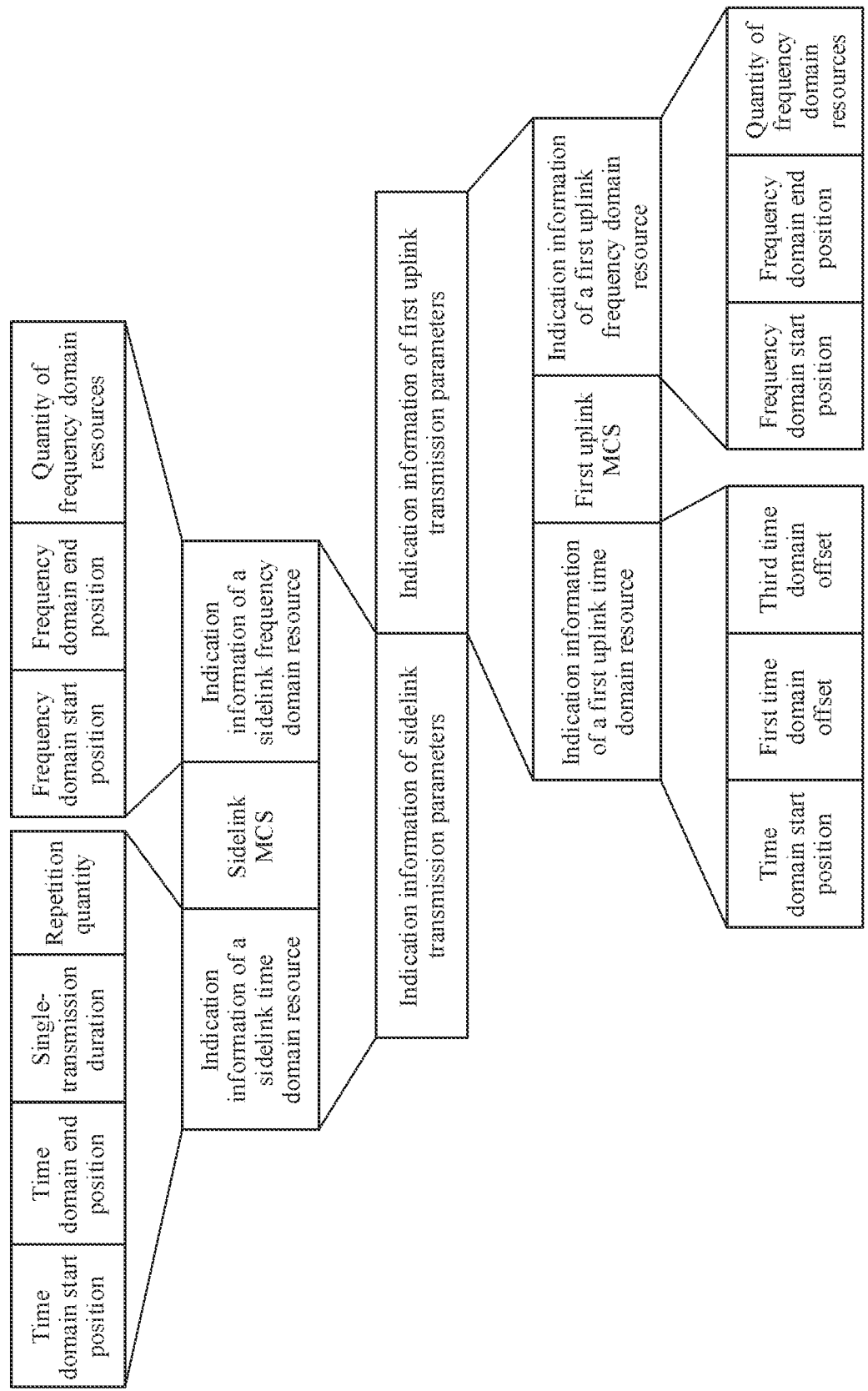
FIG. 15 is a schematic diagram 8 of DCI carrying first scheduling information according to an embodiment of this application.

For example, FIG. 15 is a schematic diagram 8 of DCI carrying first scheduling information according to an embodiment of this application. As shown in FIG. 15, the indication information of the first uplink transmission parameter and the indication information of the second uplink transmission parameter occupy only an indication field of the indication information of the first uplink transmission parameter in the first scheduling information. In other words, only one of the indication information of the first uplink transmission parameter and the indication information of the second uplink transmission parameter needs to be transmitted.

In a possible design method, before S301 is performed, the following step may be further performed:

When the first terminal needs to send data to the network device, the first terminal may send an uplink transmission request and a buffer status report (buffer status report, BSR) to the network device. The BSR carries a data volume of to-be-transmitted uplink data of the first terminal, for example, a data volume of to-be-sent data in a media access control (media access control, MAC) layer buffer (buffer) of the first terminal.

Then, the network device may determine content of the first scheduling information based on information such as the data volume, a service type of the first terminal, a quantity of idle resources in the second uplink resource between the first terminal and the network device, channel quality of a second uplink channel between the first terminal and the network device, a quantity of idle resources in the sidelink resource between the first terminal and the second terminal, channel quality of a sidelink channel between the first terminal and the second terminal, a quantity of idle resources in the first uplink resource between one or more second terminals and the network device, and channel quality of a first uplink channel between the one or more second terminals and the network device, and send the content of the first scheduling information to the first terminal and the one or more second terminals.

After S301 is performed, the first terminal, the second terminal, and the network device may complete transmission of the to-be-transmitted uplink data of the first terminal based on the first scheduling information, that is, perform the following S302 and S303.

S302: The first terminal sends the first data to the second terminal. Correspondingly, the second terminal receives the first data from the first terminal.

For example, the first terminal may send sidelink control information (sidelink control information, SCI) to the second terminal on a physical sidelink control channel (physical sidelink control channel, PSCCH). Correspondingly, the second terminal receives the SCI from the first terminal on the PSCCH. Then, the first terminal may send the first data to the second terminal on a physical sidelink shared channel (physical sidelink shared channel, PSSCH). Correspondingly, the second terminal receives the first data from the first terminal on the PSSCH.

The SCI carries sidelink demodulation information of the first data, such as a sidelink MCS and a time-frequency resource carrying a sidelink demodulation reference signal (demodulation reference signal, DMRS), so that the second terminal parses the PSSCH based on the sidelink demodulation information, to restore the original information of the first data, that is, original data before the first data is encoded and modulated.

It should be noted that, in a scenario in which the repetition quantity is greater than for example, K=8, if the second terminal successfully decodes the first data, the second terminal may send feedback information to the first terminal. The feedback information is used by the first terminal to stop sending the first data, to reduce resource overheads between the first terminal and the second terminal, and reduce power consumption of the first terminal and the second terminal. For example, if the second terminal successfully decodes the first data, the second terminal may send an acknowledgment (acknowledgement, ACK) indication bit (bit) to the first terminal on a physical sidelink feedback channel (physical sidelink feedback channel, PSFCH). A specific implementation in which the second terminal sends the feedback information to the first terminal is not specifically limited in this embodiment of this application.

S303: The second terminal sends the first data to the network device. Correspondingly, the network device receives the first data from the second terminal.

For example, if the second terminal successfully decodes the first data based on the first uplink MCS, that is, successfully obtains the original information of the first data, the second terminal may re-encode and re-modulate the original information of the first data, and send the re-encoded and re-modulated first data to the network device on the first uplink resource. In other words, the second terminal may forward the first data of the first terminal to the network device in a decode-and-forward manner.

Alternatively, optionally, if the second terminal fails to decode the first data based on the sidelink demodulation information, the second terminal may also directly forward, to the network device in a manner of increasing transmit power, a radio signal of the PSSCH that carries the first data, that is, forward the first data to the network device in an amplify-and-forward manner.

Then, the network device may demodulate and decode the received first data. For example, the radio signal that carries the first data may be demodulated and decoded based on the first uplink MCS or the sidelink MCS.

It should be noted that, in this embodiment of this application, there may be a plurality of cooperation terminals that provide an uplink cooperative transmission service for the first terminal. For example, the first terminal sends the first data to the network device through the second terminal in FIG. 1, and sends third data to the network device by using another terminal such as a third terminal (not shown in FIG. 1). If the first data and the third data are same data, and a same MCS scheme is used, the network device may perform combined decoding on the first data and the third data, to improve decoding performance of uplink transmission. It is easily understood that if the first data and the third data are different data, an uplink throughput between the first terminal and the network device can be improved.

It is easily understood that the first terminal may alternatively directly send the second data to the network device on the second uplink resource. In other words, the uplink transmission method shown in FIG. 3 may further include S304.

S304: The first terminal sends the second data to the network device. Correspondingly, the network device receives the second data from the first terminal.

The second data may be the same as the first data, or may be different from the first data. Specifically, when a channel is in a good condition, the second data may be different from the first data, to improve an uplink throughput between the first terminal and the network device, and improve communication efficiency. Alternatively, optionally, when a channel is in a poor condition, the second data may be the same as the first data, that is, the first data and the second data both are data obtained by encoding and modulating same original data by using a same MCS. The network device may perform combined decoding on the first uplink signal carrying the first data and the second uplink signal carrying the second data, to improve decoding performance and a success rate, and improve reliability of uplink data transmission between the first terminal and the network device.

According to the uplink transmission method shown in FIG. 3, the network device can indicate, in one piece of scheduling information, both the sidelink resource and the first uplink resource that are required for the uplink cooperative transmission, to improve resource scheduling efficiency, in addition, a problem that the sidelink resource and/or the uplink resource are scheduled for a plurality of times because the independently scheduled sidelink resource and uplink resource cannot adapt to the uplink cooperative transmission can be avoided. This can reduce an uplink cooperative transmission delay, and improve uplink cooperative transmission efficiency.

The uplink transmission method provided in embodiments of this application is described above in detail with reference to FIG. 3 to FIG. 15. The following describes in detail another communication apparatus in an embodiment of this application with reference to FIG. 16.

Figure 16:
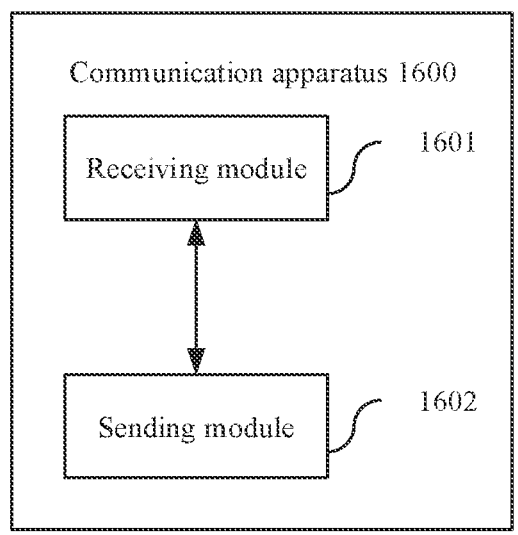
FIG. 16 is a schematic diagram 2 of a structure of a communication apparatus according to an embodiment of this application.

FIG. 16 is a schematic diagram 2 of a structure of a communication apparatus according to an embodiment of this application. The communication apparatus may be applied to the communication system shown in FIG. 1, and perform a function of the network device in the uplink transmission method shown in FIG. 3. For ease of description, FIG. 16 shows only main components of the communication apparatus 1600.

As shown in FIG. 16, the communication apparatus 1600 includes a receiving module (or receiving unit) 1601 and a sending module (or sending unit) 1602.

The sending module 1602 is configured to send first scheduling information to a first terminal and a second terminal. The first scheduling information includes indication information of a sidelink transmission parameter and indication information of a first uplink transmission parameter. The sidelink transmission parameter is used by the first terminal to send first data to the second terminal. The first uplink transmission parameter is used by the second terminal to send the first data to the network device.

The receiving module 1601 is configured to receive the first data from the second terminal.

In a possible design, the first scheduling information may further include indication information of a second uplink transmission parameter, and the second uplink transmission parameter is used by the first terminal to send second data to the network device. The receiving module 1601 is further configured to receive the second data from the first terminal.

In another possible design, the communication apparatus 1600 may also be applied to the communication system shown in FIG. 1, and perform a function of the first terminal in the uplink transmission method shown in FIG. 3.

The receiving module 1601 is configured to receive first scheduling information from the network device. The first scheduling information includes indication information of a sidelink transmission parameter and indication information of a first uplink transmission parameter. The sidelink transmission parameter is used by the first terminal to send first data to the second terminal. The first uplink transmission parameter is used by the second terminal to send the first data to the network device. The sending module 1602 is configured to send the first data to the second terminal.

In a possible design, the first scheduling information may further include indication information of a second uplink transmission parameter, and the second uplink transmission parameter is used by the first terminal to send second data to the network device. The sending module 1602 is further configured to send the second data to the network device.

In another possible design, the communication apparatus 1600 may also be applied to the communication system shown in FIG. 1, and perform a function of the second terminal in the uplink transmission method shown in FIG. 3.

The receiving module 1601 is configured to receive first scheduling information from the network device. The first scheduling information includes indication information of a sidelink transmission parameter and indication information of a first uplink transmission parameter. The sidelink transmission parameter is used by the first terminal to send first data to the second terminal. The first uplink transmission parameter is used by the second terminal to send the first data to the network device.

The receiving module 1601 is further configured to receive the first data from the first terminal. The sending module 1602 is configured to send the first data to the network device.

In a possible design, the first scheduling information may further include indication information of a second uplink transmission parameter, and the second uplink transmission parameter is used by the first terminal to send second data to the network device.

In the communication apparatus 1600 shown in FIG. 16, the sidelink transmission parameter may include indication information of a sidelink time domain resource, and the sidelink time domain resource is used by the first terminal to send the first data to the second terminal. Correspondingly, the first uplink transmission parameter may include indication information of a first uplink time domain resource, the first uplink time domain resource is used by the second terminal to send the first data to the network device, the second uplink transmission parameter may include indication information of a second uplink time domain resource, and the second uplink time domain resource is used by the first terminal to send the second data to the network device.

For example, the indication information of the sidelink time domain resource may include one or more of a time domain start position, a time domain end position, single-transmission duration, and a repetition quantity that are of the sidelink resource. The time domain start position of the sidelink resource is a start position of the first transmission in one or more transmissions corresponding to the repetition quantity, for example, a slot in which the first symbol in the first transmission is located. The time domain end position of the sidelink resource is an end position of the last transmission in one or more transmissions corresponding to the repetition quantity, for example, a slot (slot) in which the last symbol in the last transmission is located. The repetition quantity is a positive integer. Alternatively, the repetition quantity may not be configured, and in this case, single transmission is used by default.

For example, the indication information of the first uplink time domain resource may include a time domain start position of the first uplink resource, or a time domain offset between a time domain start position of the first uplink resource and the time domain start position or the time domain end position of the sidelink resource. The time domain start position of the first uplink resource may be one or both of a start symbol (symbol) of the first uplink resource in time domain and a slot in which the start symbol is located.

Optionally, the time domain offset between the time domain start position of the first uplink resource and the time domain start position or the time domain end position of the sidelink resource may include one of the following: a first time domain offset and a third time domain offset. The first time domain offset may be a time domain offset between the time domain start position of the first uplink resource and the time domain end position of the sidelink resource; and the third time domain offset may be a time domain offset between the time domain start position of the first uplink resource and the time domain start position of the sidelink resource.

In embodiments of this application, the time domain start position of the first uplink resource may be directly configured, or may be determined in the following manner 1 to manner 3. Details are described below.

Manner 1: The time domain start position of the first uplink resource is: a sum of the time domain start position of the sidelink resource and the third time domain offset.

Manner 2: The time domain start position of the first uplink resource is: a sum of the time domain end position of the sidelink resource and the first time domain offset.

Manner 3: The time domain start position of the first uplink resource is: a sum of the time domain start position of the sidelink resource, total sidelink transmission duration, and the first time domain offset.

For example, the indication information of the second uplink time domain resource may include a time domain start position of the second uplink resource, or a time domain offset between a time domain start position of the second uplink resource and the time domain start position or the time domain end position of the sidelink resource. The time domain start position of the second uplink resource may be one or both of a start symbol of the second uplink resource in time domain and a slot in which the start symbol is located.

Optionally, the time domain offset between the time domain start position of the second uplink resource and the time domain start position or the time domain end position of the sidelink resource may include one of the following a second time domain offset and a fourth time domain offset. The second time domain offset may be a time domain offset between the time domain start position of the second uplink resource and the time domain end position of the sidelink resource and the fourth time domain offset may be a time domain offset between the time domain start position of the second uplink resource and the time domain start position of the sidelink resource.

In embodiments of this application, the time domain start position of the second uplink resource may be directly configured, or may be determined in the following manner 4 to manner 6, Details are described below.

Manner 4: The time domain start position of the second uplink resource is: a sum of the time domain start position of the sidelink resource and the fourth time domain offset.

Manner 5: The time domain start position of the second uplink resource is: a sum of the time domain end position of the sidelink resource and the second time domain offset.

Manner 6: The time domain start position of the second uplink resource is: a sum of the time domain start position of the sidelink resource, total sidelink transmission duration, and the second time domain offset.

It should be noted that, in the foregoing manner 3 and manner 6, when the repetition quantity is configured to 1, or the repetition quantity is not configured, that is, sidelink transmission is a single transmission, the total sidelink transmission duration is single-transmission duration.

Optionally, when the repetition quantity is greater than 1, for example, when the sidelink transmission is a plurality of continuous transmissions, the total sidelink transmission duration is a product of the single-transmission duration and the repetition quantity.

Further, in the uplink transmission method according to any one of the first aspect to the third aspect, the first uplink transmission parameter may further include a first uplink MCS, and the second uplink transmission parameter may further include a second uplink MCS, The first uplink MCS and the second uplink MCS are indicated by a same indication field in the first scheduling information. In other words, when the first uplink MCS and the second uplink MCS are the same, the first uplink MCS and the second uplink MCS may occupy a same indication field in the first scheduling information, to reduce signaling overheads.

Still further, in the communication apparatus 1600 shown in FIG. 16, the first uplink transmission parameter may further include indication information of a first uplink frequency domain resource, the first uplink frequency domain resource is used by the second terminal to send the first data to the network device, the second uplink transmission parameter may further include indication information of a second uplink frequency domain resource, and the second uplink frequency domain resource is used by the first terminal to send the second data to the network device. The indication information of the first uplink frequency domain resource and the indication information of the second uplink frequency domain resource are indicated by a same indication field in the first scheduling information. In other words, when the indication information of the first uplink frequency domain resource and the indication information of the second uplink frequency domain resource are the same, the indication information of the first uplink frequency domain resource and the indication information of the second uplink frequency domain resource may occupy a same indication field in the first scheduling information, to further reduce signaling overheads.

In the communication apparatus 1600 shown in FIG. 16, the second data may be different from the first data, or may be the same as the first data. This is not limited in this embodiment of this application.

Optionally, the communication apparatus 1600 shown in FIG. 16 may further include a processing module and/or a storage module (not shown in FIG. 16). The processing module may control the sending module 1602 and the receiving module 1601 to complete the uplink transmission method in the foregoing method embodiment. The storage module stores a program or instructions. When the processing module executes the program or the instructions, the communication apparatus 1600 shown in FIG. 16 is enabled to perform the uplink transmission method in the foregoing method embodiment.

It should be noted that the communication apparatus 1600 shown in FIG. 16 may be the first terminal, the second terminal, or the network device shown in FIG. 1, or the communication apparatus 200 shown in FIG. 2, or may be a component or a combined component disposed in the first terminal, the second terminal, or the network device, such as a chip or a chip system. This is not limited in this embodiment of this application.

When the communication apparatus 1600 shown in FIG. 16 is a terminal device or a network device, the receiving module 1601 and the sending module 1602 may be respectively a receiver and a transmitter in the terminal device or the network device, or the receiving module 1601 and the sending module 1602 may be combined into one component, for example, a transceiver having a receiving function and a sending function in the terminal device or the network device. The receiving module 1601, the sending module 1602, and the transceiver may include an antenna, a radio frequency circuit, and the like. The processing module in the communication apparatus 1600 shown in FIG. 16 may be a processor such as a central processing unit (central processing unit, CPU).

When the communication apparatus 1600 is a component having a function of the foregoing terminal device or network device, for example, a chip or a chip system, the receiving module 1601 and the sending module 1602 may be radio frequency units, and the processing module may be a processor. When the communication apparatus 1600 is a chip system, the receiving module 1601 and the sending module 1602 may be an input/output interface of the chip system, and the processing module may be a processor in the chip system.

For technical effects of the communication apparatus 1600, refer to technical effects of the uplink transmission method shown in FIG. 3. Details are not described herein again.

An embodiment of this application provides a chip system. The chip system includes a processor and an input/output port. The processor is coupled to a memory including instructions, and is configured to control a communication apparatus installed with the chip system to implement the uplink transmission method according to the foregoing method embodiment.

The memory may be a memory, for example, an internal cache, integrated in the chip system, or may be an external memory, for example, an external cache, that is located outside the chip system and has a signal connection to the chip system; or may include both an internal memory and an external memory. The memory is configured to store program instructions and data for implementing the uplink transmission method in the foregoing method embodiment.

The chip system may include a chip, or may include a chip and another discrete component.

An embodiment of this application provides a communication system. The system includes a network device and at least two terminal devices, for example, a first terminal and a second terminal.

An embodiment of this application provides a computer-readable storage medium. The computer-readable storage medium stores computer instructions. When the computer instructions are run on a computer, the computer is enabled to perform the uplink transmission method in the foregoing method embodiment.

An embodiment of this application provides a computer program product including instructions. The computer program product includes a computer program or the instructions. When the computer program is run or the instructions are run on a computer, the computer is enabled to perform the uplink transmission method in the foregoing method embodiment.

It should be understood that, the processor in embodiments of this application may be a central processing unit (central processing unit, CPU), or may be another general-purpose processor, a digital signal processor (digital signal processor, DSP), application-specific integrated circuit (application-specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor or the like.

It may be further understood that the memory in embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. Through example but not limitative description, random access memories random access memories, RAMs) in various forms are available, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware (for example, a circuit), firmware, or any combination thereof. When the software is used for implementation, all or some of the foregoing embodiments may be implemented in a form of a computer program product. The computer program product includes one or more computer instructions or computer programs. When the program instructions or the computer programs are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: only A exists, both A and B exist, and only B exists. A and B may be singular or plural. In addition, the character "/" in this specification usually represents an "or" relationship between the associated objects, or may represent an "and/or" relationship. A specific meaning depends on a context.

In this application, "at least one" refers to one or more, and "a plurality of" refers to two or more. The term "at least one (piece) of the following" or a similar expression thereof means any combination of these items, including any combination of one (piece) or a plurality (pieces). For example, at least one (piece) of a, b, or c may indicate: a, b, c, a and b, a and c, b and c, or a, b, and c, where a, b, and c may be singular or plural.

it should be understood that sequence numbers of the foregoing processes do not mean execution sequences in various embodiments of this application. The execution sequences of the processes should be determined based on functions and internal logic of the processes, but should not be construed as any limitation on the implementation processes in embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiment. Details are not described herein again.

In several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separated, and parts displayed as units may or may not be physical units, that is, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to a current technology, or some of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An uplink transmission method, comprising:
    sending, by a network device, first scheduling information to a first terminal and a second terminal, wherein the first scheduling information comprises indication information of a sidelink transmission parameter and indication information of a first uplink transmission parameter, the sidelink transmission parameter is used by the first terminal to send first data to the second terminal, and the first uplink transmission parameter is used by the second terminal to send the first data to the network device, and wherein:
    the sidelink transmission parameter comprises indication information of a sidelink time domain resource, the sidelink time domain resource is used by the first terminal to send the first data to the second terminal, and the indication information of the sidelink time domain resource comprises a time domain start position, a time domain end position, single-transmission duration, and a repetition quantity that are of the sidelink time domain resource; and
    the first uplink transmission parameter comprises indication information of a first uplink time domain resource, the first uplink time domain resource is used by the second terminal to send the first data to the network device, and the indication information of the first uplink time domain resource comprises a first time domain offset, and the first time domain offset is a time domain offset between a time domain start position of the first uplink time domain resource and the time domain end position of the sidelink time domain resource; and
    receiving, by the network device, the first data from the second terminal.

2. The uplink transmission method according to claim 1, wherein:
    the first scheduling information further comprises indication information of a second uplink transmission parameter, and the second uplink transmission parameter is used by the first terminal to send second data to the network device; and
    the uplink transmission method further comprises:
        receiving, by the network device, the second data from the first terminal.

3. The uplink transmission method according to claim 2, wherein:
    the second uplink transmission parameter comprises indication information of a second uplink time domain resource, and the second uplink time domain resource is used by the first terminal to send the second data to the network device.

4. An uplink transmission method, comprising:
    receiving, by a first terminal, first scheduling information from a network device, wherein the first scheduling information comprises indication information of a sidelink transmission parameter and indication information of a first uplink transmission parameter, the sidelink transmission parameter is used by the first terminal to send first data to a second terminal, and the first uplink transmission parameter is used by the second terminal to send the first data to the network device, and wherein:
    the sidelink transmission parameter comprises indication information of a sidelink time domain resource, the sidelink time domain resource is used by the first terminal to send the first data to the second terminal, and the indication information of the sidelink time domain resource comprises a time domain start position, a time domain end position, single-transmission duration, and a repetition quantity that are of the sidelink time domain resource; and the first uplink transmission parameter comprises indication information of a first uplink time domain resource, the first uplink time domain resource is used by the second terminal to send the first data to the network device, and the indication information of the first uplink time domain resource comprises a first time domain offset, and the first time domain offset is a time domain offset between a time domain start position of the first uplink time domain resource and the time domain end position of the sidelink time domain resource; and sending, by the first terminal, the first data to the second terminal.

5. The uplink transmission method according to claim 4, wherein:

the first scheduling information further comprises indication information of a second uplink transmission parameter, and the second uplink transmission parameter is used by the first terminal to send second data to the network device; and the uplink transmission method further comprises:
sending, by the first terminal, the second data to the network device.

6. The uplink transmission method according to claim 5, wherein:

the second uplink transmission parameter comprises indication information of a second uplink time domain resource, and the second uplink time domain resource is used by the first terminal to send the second data to the network device.

7. An uplink transmission method, comprising:

receiving, by a second terminal, first scheduling information from a network device, wherein the first scheduling information comprises indication information of a sidelink transmission parameter and indication information of a first uplink transmission parameter, the sidelink transmission parameter is used by a first terminal to send first data to the second terminal, and the first uplink transmission parameter is used by the second terminal to send the first data to the network device, and wherein:

the sidelink transmission parameter comprises indication information of a sidelink time domain resource, the sidelink time domain resource is used by the first terminal to send the first data to the second terminal, and the indication information of the sidelink time domain resource comprises a time domain start position, a time domain end position, single-transmission duration, and a repetition quantity that are of the sidelink time domain resource; and the first uplink transmission parameter comprises indication information of a first uplink time domain resource, the first uplink time domain resource is used by the second terminal to send the first data to the network device, and the indication information of the first uplink time domain resource comprises a first time domain offset, and the first time domain offset is a time domain offset between a time domain start position of the first uplink time domain resource and the time domain end position of the sidelink time domain resource;

receiving, by the second terminal, the first data from the first terminal; and sending, by the second terminal, the first data to the network device.

8. The uplink transmission method according to claim 7, wherein the first scheduling information further comprises indication information of a second uplink transmission parameter, and the second uplink transmission parameter is used by the first terminal to send second data to the network device.

9. The uplink transmission method according to claim 8, wherein:

the second uplink transmission parameter comprises indication information of a second uplink time domain resource, and the second uplink time domain resource is used by the first terminal to send the second data to the network device.

10. A communication apparatus, wherein the communication apparatus is used as a network device to communicate with a first terminal and a second terminal, the communication apparatus comprises one or more processors and a memory, and the memory stores a computer program that when executed by the one or more processors, causes the communication apparatus to perform operations comprising:

sending first scheduling information to the first terminal and the second terminal, wherein the first scheduling information comprises indication information of a sidelink transmission parameter and indication information of a first uplink transmission parameter, the sidelink transmission parameter is used by the first terminal to send first data to the second terminal, and the first uplink transmission parameter is used by the second terminal to send the first data to the network device, and wherein:

the sidelink transmission parameter comprises indication information of a sidelink time domain resource, the sidelink time domain resource is used by the first terminal to send the first data to the second terminal, and the indication information of the sidelink time domain resource comprises a time domain start position, a time domain end position, single-transmission duration, and a repetition quantity that are of the sidelink time domain resource; and the first uplink transmission parameter comprises indication information of a first uplink time domain resource, the first uplink time domain resource is used by the second terminal to send the first data to the network device, and the indication information of the first uplink time domain resource comprises a first time domain offset, and the first time domain offset is a time domain offset between a time domain start position of the first uplink time domain resource and the time domain end position of the sidelink time domain resource; and receiving the first data from the second terminal.

11. The communication apparatus according to claim 10, wherein:

the first scheduling information further comprises indication information of a second uplink transmission parameter, and the second uplink transmission parameter is used by the first terminal to send second data to the network device; and the operations further comprise:
receiving the second data from the first terminal.

12. A communication apparatus, wherein the communication apparatus is used as a first terminal to communicate with a network device and a second terminal, and the communication apparatus comprises one or more processors and a memory, and the memory stores a computer program that when executed by the one or more processors, causes the communication apparatus to perform operations comprising:

receiving first scheduling information from the network device, wherein the first scheduling information comprises indication information of a sidelink transmission parameter and indication information of a first uplink transmission parameter, the sidelink transmission parameter is used by the first terminal to send first data to the second terminal, and the first uplink transmission parameter is used by the second terminal to send the first data to the network device, and wherein:
- the sidelink transmission parameter comprises indication information of a sidelink time domain resource, the sidelink time domain resource is used by the first terminal to send the first data to the second terminal, and the indication information of the sidelink time domain resource comprises a time domain start position, a time domain end position, single-transmission duration, and a repetition quantity that are of the sidelink time domain resource; and
- the first uplink transmission parameter comprises indication information of a first uplink time domain resource, the first uplink time domain resource is used by the second terminal to send the first data to the network device, and the indication information of the first uplink time domain resource comprises a first time domain offset, and the first time domain offset is a time domain offset between a time domain start position of the first uplink time domain resource and the time domain end position of the sidelink time domain resource; and sending the first data to the second terminal.

13. The communication apparatus according to claim 12, wherein the first scheduling information further comprises indication information of a second uplink transmission parameter, and the second uplink transmission parameter is used by the first terminal to send second data to the network device; and the operations further comprise:
sending the second data to the network device.

14. The communication apparatus according to claim 13, wherein:
the second uplink transmission parameter comprises indication information of a second uplink time domain resource, and the second uplink time domain resource is used by the first terminal to send the second data to the network device.

15. A communication apparatus, wherein the communication apparatus is used as a second terminal to communicate with a network device and a first terminal, the communication apparatus comprises one or more processors and a memory, and the memory stores a computer program that when executed by the one or more processors, causes the communication apparatus to perform operations comprising:
receiving first scheduling information from the network device, wherein the first scheduling information comprises indication information of a sidelink transmission parameter and indication information of a first uplink transmission parameter, the sidelink transmission parameter is used by the first terminal to send first data to the second terminal, and the first uplink transmission parameter is used by the second terminal to send the first data to the network device, and wherein:
- the sidelink transmission parameter comprises indication information of a sidelink time domain resource, the sidelink time domain resource is used by the first terminal to send the first data to the second terminal, and the indication information of the sidelink time domain resource comprises a time domain start position, a time domain end position, single-transmission duration, and a repetition quantity that are of the sidelink time domain resource; and
- the first uplink transmission parameter comprises indication information of a first uplink time domain resource, the first uplink time domain resource is used by the second terminal to send the first data to the network device, and the indication information of the first uplink time domain resource comprises a first time domain offset, and the first time domain offset is a time domain offset between a time domain start position of the first uplink time domain resource and the time domain end position of the sidelink time domain resource;

receiving the first data from the first terminal; and
sending the first data to the network device.

16. The communication apparatus according to claim 15, wherein the first scheduling information further comprises indication information of a second uplink transmission parameter, and the second uplink transmission parameter is used by the first terminal to send second data to the network device.

17. The communication apparatus according to claim 16, wherein:
the second uplink transmission parameter comprises indication information of a second uplink time domain resource, and the second uplink time domain resource is used by the first terminal to send the second data to the network device.

* * * * *